(12) United States Patent
Hui et al.

(10) Patent No.: US 6,237,010 B1
(45) Date of Patent: May 22, 2001

(54) MULTIMEDIA APPLICATION USING FLASHPIX FILE FORMAT

(75) Inventors: Jonathan Hui, Fremont; Chris See Liang Yeo, Redwood City, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/944,411

(22) Filed: Oct. 6, 1997

(51) Int. Cl.⁷ .............................. G06F 15/00; G09G 3/34; G09G 5/00; G06T 17/00

(52) U.S. Cl. .................. 707/502; 345/112; 345/118; 345/428

(58) Field of Search ..................................... 345/112, 113, 345/114–116; 707/502, 528, 500, 524, 517, 104, 513; 358/442, 527, 408, 211

(56) References Cited

U.S. PATENT DOCUMENTS

| | | | |
|---|---|---|---|
| 5,742,779 | * 4/1998 | Steele et al. | 345/349 |
| 5,760,916 | * 6/1998 | Dellert et al. | 358/408 |
| 5,760,917 | * 6/1998 | Sheridan | 358/442 |
| 5,796,428 | * 8/1998 | Matsumoto et al. | 348/231 |
| 5,898,779 | * 4/1999 | Squilla et al. | 380/23 |

OTHER PUBLICATIONS

"What's New", Picture It! Home Page (visited Sep. 12, 1997), Microsoft Corporation, 1997, <http://www.microsoft.com/pictureit> (1 page).

"Tips & Ideas", Picture It! —Tips & Ideas (visited Sep. 12, 1997), Microsoft Corporation, 1997, <http://www.microsoft.com/pictureit/tips.htm> (1 page).

"Tips & Ideas—Tips & Techniques", Picture It! —Tips & Techniques (visited Sep. 12, 1997), Microsoft Corporation, 1997, <http://www.microsoft.com/pictureit/tips.htm> (1 page).

"Tips & Ideas—Tech Talk", Picture It! —Tech Talk (visited Sep. 12, 1997), Microsoft Corporation, 1997, <http://www.microsoft.com/pictureit.tips.htm> (1 page).

"Product Info—Fact Sheet", Picture It! —Tech Talk (visited Sep. 12, 1997), Microsoft Corporation, 1997, <http://www-.microsoft.com/pictureit/prod.htm> (2 pages).

"Product Info—Press", Picture It! Press (visited Sep. 12, 1997), <http://www.microsoft.com/pictureit/prod.htm> (5 pages).

"Online Demo", Picture It! Demo—Introduction (visited Sep. 12, 1997), Microsoft Corporation, 1997, <http://www.microsoft.com/pictureit/demo.htm> (1 page).

"Online Demo", Picture It! Demo (visited Sep. 12, 1997), Microsoft Corporation, 1997, <http://www.microsoft.com/pictureit/demo.htm> (4 pages).

"Making Pictures As Easy As Words", FlashPix Home Page (visited Sep. 5, 1997, Eastman Kodak Company, 1994–1997, <http://www.kodak.com/aboutKodak/bu/dai/flashPixHome.shtml> (1 page).

(List continued on next page.)

*Primary Examiner*—Kim Vu
*Assistant Examiner*—Alford W. Kindred
(74) *Attorney, Agent, or Firm*—Fitzpatrick, Cella, Harper & Scinto

(57) ABSTRACT

A system, for use on a computer system, creates and publishes a set of images, each image in the set being stored in a FlashPix file which contains at least the image in multiple resolutions, viewing parameters for viewing the image, and information related to the image. The system includes displaying, on a computer-generated workbench, a plurality of images retrieved from FlashPix files, and correcting images displayed in the workbench. In the system, image correction comprises altering viewing parameters in FlashPix files corresponding to the displayed images. The system also composes displayed images by adding or deleting, from FlashPix files corresponding to the displayed images, information related to the displayed images, and publishes a set of images displayed on the workbench. The set of published images includes corrected and composed images.

84 Claims, 26 Drawing Sheets

OTHER PUBLICATIONS

"How Does It Work ?", FlashPix Primer (visited Sep. 5, 1997), Eastman Kodak Company, 1994–1997, <http://www.kodak.com/daiHome/flashPix/flashPixPrimer.shtml> (3 pages).

Flash Forward (visited Sep. 5, 1997), Eastman Kodak Company, 1994–1997, <http://www.kodak.com/daiHome/flashPix/flashForward.shtml> (1 page).

"Connect Your Family", Kodak: FlashPix at Home (visited Sep. 5, 1997), Eastman Kodak Company, 1994–1997, <http://www.kodak.com/daiHome/flashPix/atHome.shtml> (2 pages).

"The FlashPix Format—Changing The Shape of Digital Imaging", Kodak: DRG—FlashPix2 (visited Sep. 5, 1997), Eastman Kodak Company, 1994–1997, <http://www.kodak.com/drgHome/productsTechnologies/FPX.shtml (3 pages).

"Who, What, Where, Why, How", FlashPix Frequently Asked Questions (visited Sep. 5, 1997), Eastman Kodak Company, 1994–1997, <http://www.kodak.com/daiHome/flashPix/flashPix/FAQ.shtml> (3 pages).

"FlashPix Format —Internet Imaging Protocol", Kodak: DRG—FlashPix2 (visited Sep. 12, 1997), Eastman Kodak Company, 1994–1997 (2 pages).

"FlashPix Format —Products & Technologies", Kodak Developer Relations Group–FlashPix Int . . . (visited Sep. 14, 1997), Eastman Kodak Company, 1994–1997.

"FlashPix Format—FlashPix Format Specification, Version 1.0.1", Jul. 10, 1997.

"See For Yourself", Kodak: FlashPix Sample Pictures Index (visited Sep. 5, 1997), Eastman Kodak Company, 1994–1997, <http://www.kodak.com/diaHome/FlashPix/flashPixSamples.shtml> (1 page).

* cited by examiner

MULTIMEDIA APPLICATION USING FLASHPIX FILE FORMAT

BACKGROUND OF THE INVENTION

1. Field of the Invention

The present invention relates to a computer-executable multimedia application which collects images from one or more sources, displays a plurality of the collected images on a computer-generated workbench, manipulates (e.g., color-corrects or edits) the images on the workbench, composes the images, and publishes a set of the images as an album or the like.

2. Description of the Related Art

As background, FlashPix-format files store data for an image as well as additional information related to the image. Typically, Flashpix files store data for an image in multiple (e.g., four) resolutions, viewing parameters which comprise transformations and the like that affect how the image is displayed, and information related to the image, such as the date that the image was formed, etc. In addition, an "extension list" can be added to the FlashPix file, to store additional, user-specified information for the image, such as audio information.

Image editing applications, such as Microsoft's "PictureIt!", have been developed which take advantage of some of the features of the FlashPix file format relating to retrieval, correction, and display of images. These applications, however, have yet to exploit fully the advantages of FlashPix.

Conventional image editing applications retrieve a low resolution image from a FlashPix file, correct the low resolution image by changing viewing parameters for the image, and then retrieve a higher resolution image from the FlashPix file for printing. However, such applications do not retrieve and view a plurality of images which are to be published as a set of images in an album, a slide show, or the like. Because conventional applications do not display plural images from a set of images to be published, it is difficult to coordinate correction and composition of the images in the set.

Moreover, conventional image editing applications are also limited as to the types of information which are published with an image. For example, conventional image editing applications add audio information or a written caption to an image's FlashPix file, but do not add or publish information relating to the source of the image, such as whether the image was captured from a camera, the focal length of the camera, etc.

Thus, there exists a need for a system which creates a set of images having a FlashPix file format, and which displays a plurality of the images in the set, prior to publication of the set. Additionally, there exists a need for a system which publishes, along with each image, information relating to the source of the image.

SUMMARY OF THE INVENTION

The present invention addresses the foregoing needs by providing a system that displays, on a computer-generated workbench, a plurality of images retrieved from FlashPix files, prior to correcting and composing the images and prior to publishing a set of the images. By displaying the plurality of images in this manner, the invention makes it possible to coordinate image correction and composition among the plurality of images in the set.

Moreover, because the plurality of images are stored as FlashPix files, in preferred embodiments of the invention, low resolution images can be displayed while high resolution images can be published. As a result, the amount of time and memory required to display the plurality of images on the workbench is reduced, without affecting the quality of the published images.

Thus, according to one aspect, the present invention is a system, for use on a computer system, of creating and publishing a set of images. Each image in the set is stored in a FlashPix file which contains at least the image in multiple resolutions, viewing parameters for viewing the image, and information related to the image. In the system, a plurality of images retrieved from FlashPix files are displayed on a computer-generated workbench, images displayed on the workbench are corrected, meaning that viewing parameters in FlashPix files corresponding to the displayed images are altered, and displayed images are composed by adding or deleting, from FlashPix files corresponding to the displayed images, information related to the displayed images. A set of the images displayed on the workbench, comprising corrected and composed images, is then published.

In preferred embodiments of the invention, before displaying the plurality of images on the workbench, a plurality of low resolution images are collected from FlashPix files, and a plurality of the collected low resolution images are selected for inclusion onto the workbench. By virtue of these features of the invention, it is possible to choose which of the collected images are to be displayed on the workbench.

In related preferred embodiments, a plurality of collected low resolution images are displayed on a computer-generated workspace, and displayed low resolution images are selected for inclusion into the set of images on the workbench. By virtue of these features, it is possible to view collected images before adding the images to the workbench.

In other preferred embodiments of the invention, FlashPix images are collected from one or more of the following sources: a hardware device, stored files, an electronic album, the World Wide Web, and a database; and information relating to each image, including the source of the image, is published with that image. This is an advantage over conventional applications, which do not publish, along with each image, information relating to the source of each image.

In related preferred embodiments of the invention, types of information associated with each image in the set of images are selected, and a selected type of information is published with each image in the set. By virtue of these features, it is possible to publish with each image only selected information.

In still other preferred embodiments, the set of images is published to one of the following destinations: a video screen, the World Wide Web, and an image forming device, such as a printer. By virtue of these features, the invention makes it possible to publish a set of images as a slide show, an electronic album, or the like, to a variety of different sources.

In still other preferred embodiments of the invention, displayed images may be published in a variety of different ways. For example, a contact sheet comprising thumbnail versions of the images displayed in the workbench may be published. Alternatively, one or more of the images displayed on the workbench may be published. In addition, a single image displayed on the workspace may also be published.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
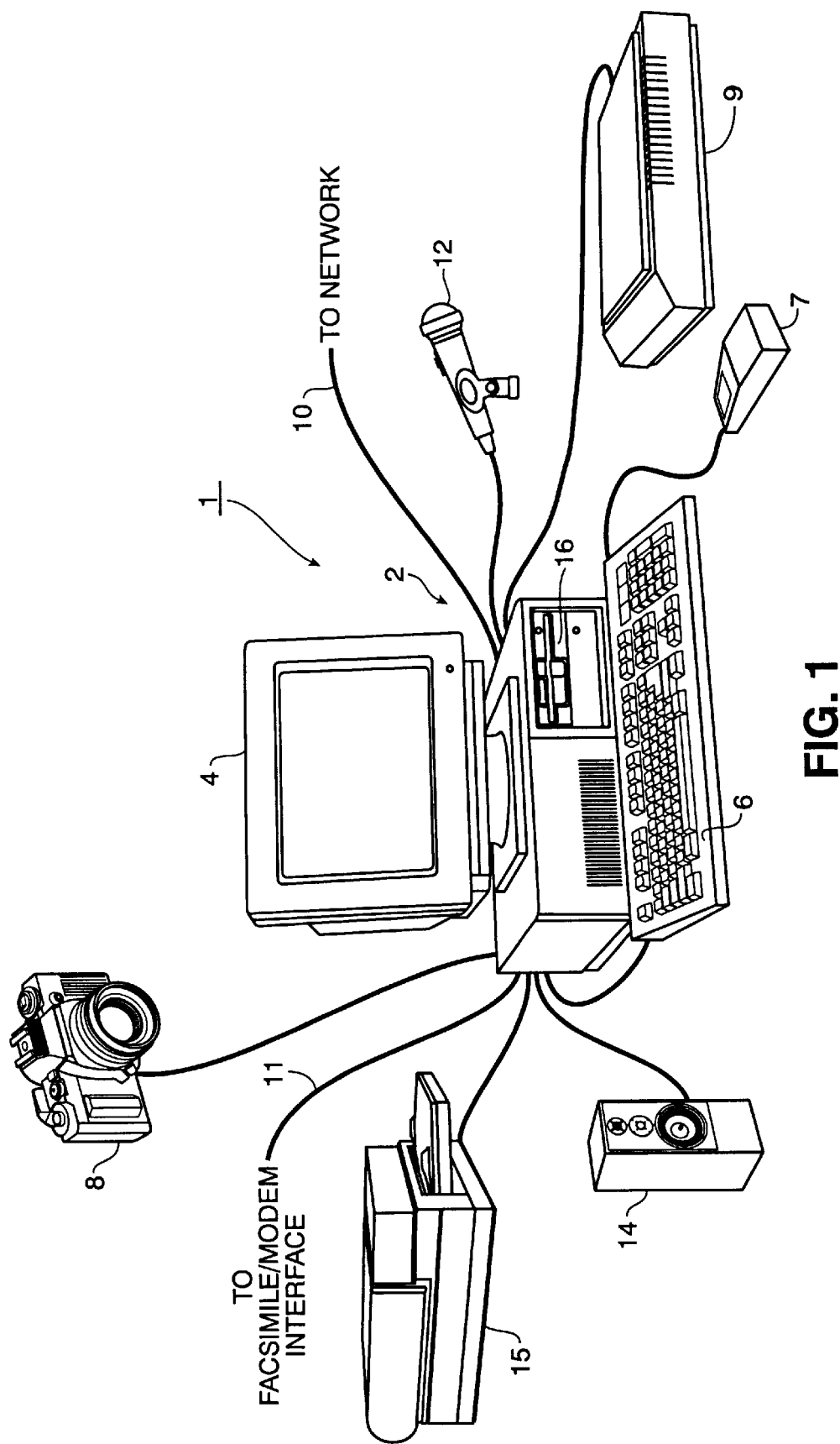
FIG. 1 is a perspective view of computing equipment used in the present invention.

FIG. 1 is a view showing the outward appearance of computing equipment used in a representative embodiment of the present invention. In the present invention, computing equipment 1 includes personal computer (hereinafter "PC") 2, which, in preferred embodiments of the invention, is an IBM PC-compatible computer having a windowing operating system, such as Microsoft® Windows95.

Provided with computing equipment 1 are display screen 4 comprising a color monitor or the like, keyboard 6 for entering text data and user commands, pointing device 7 such as a mouse for pointing and for manipulating objects displayed on display screen 4, and digital camera 8 and scanner 9 for acquiring image data. In addition, network interface 10 and facsimile/modem interface 11, also included with computing equipment 1, can be used to input image and/or text data from other sources, such as external hardware devices or the World Wide Web. Audio files can also be input via network interface 10 and facsimile/modem interface 11, or created "on the spot" using microphone 12. Speaker 14 allows a user to listen to these audio files, and printer 15 allows a user to print text, images, and the like via computing equipment 1.

Figure 2:
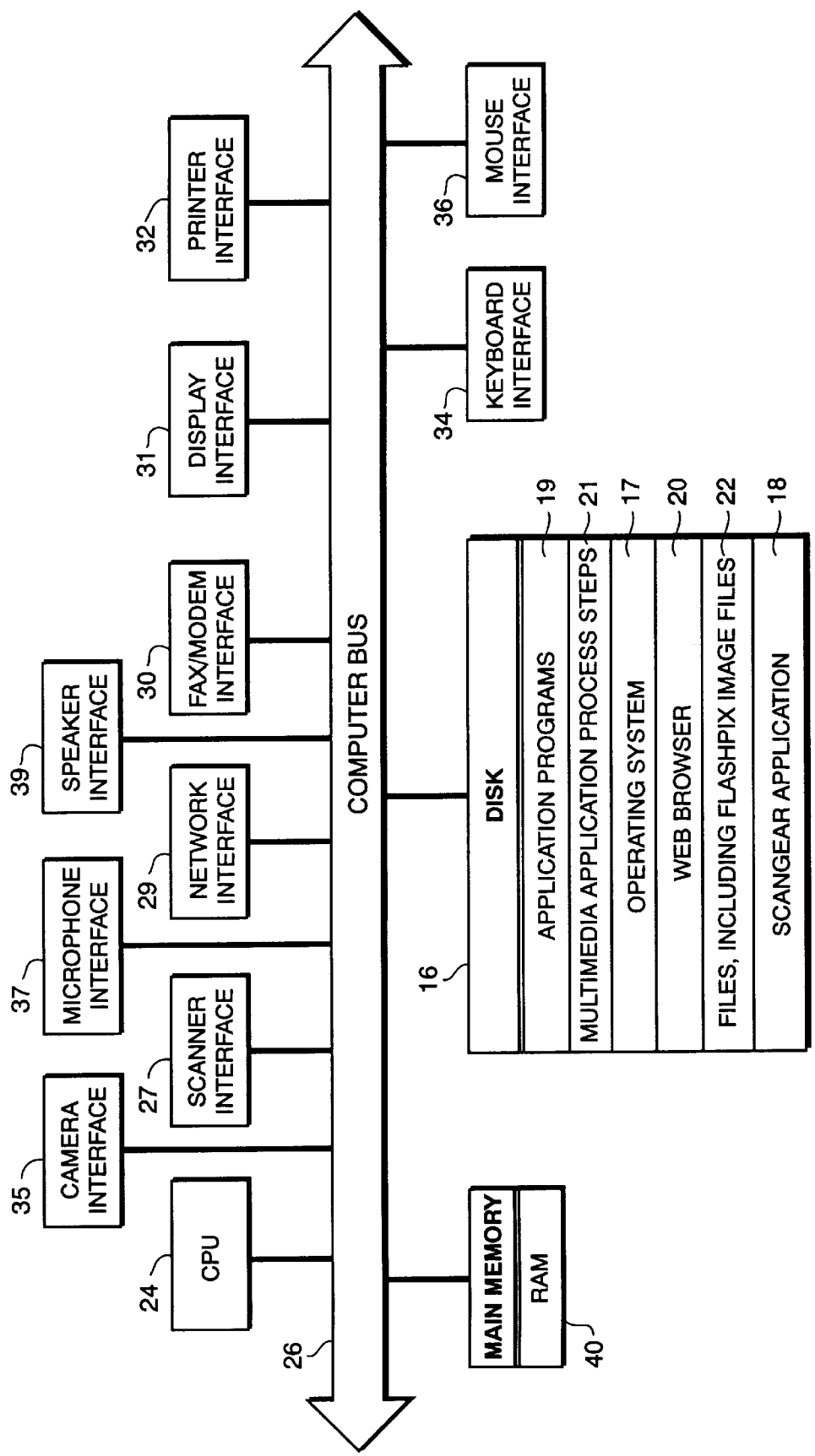
FIG. 2 shows the internal structure of the computing equipment shown in FIG. 1.

Computing equipment 1 includes a computer-readable memory medium, such as computer disk 16. As shown in FIG. 2, computer disk 16 stores operating system 17, ScanGear application 18, application programs 19, and Web browser 20. Operating system 17, which in preferred embodiments of the invention is Windows95, is used to organize and execute application programs 19. Application programs 19 are used to generate files, manipulate and store those files on disk 16, and present data in those files to an operator via display screen 4. ScanGear application 18 is software developed by Canon Information Systems, Inc., which uses TWAIN architecture to interact with, and to retrieve images from, a scanner. Use of ScanGear application 18 in conjunction with the present invention is described in more detail below. Web browser 20, when executed, permits a user to interact with the World Wide Web via computing equipment 1.

Also stored on computer disk 16 is multimedia application process steps 21, a representative embodiment of which is the Multimedia Photo Studio computer program developed by Canon Information Systems, Inc. Process steps 21 comprise the present invention, and are executed within operating system 17. When executed, process steps 21, among other things, collect, correct, compose and publish a set of images. Execution of process steps 21 is described in more detail below.

In addition to software, files, including FlashPix image files 22, are stored on computer disk 16. These FlashPix files may be generated by application programs 19, or obtained from other sources, such as the World Wide Web, an external hardware device (e.g., a camera, a scanner), etc. As noted above, FlashPix-format files store raw data for an image as well as additional information relating to the image. Typically, Flashpix files store (1) the image in multiple resolutions, (2) viewing parameters which comprise transformations and the like that affect how the image is displayed, and (3) information relating to the image, such as the date that the image was formed, the hardware device that formed the image, settings on such a hardware device, etc.

In addition, FlashPix files can also include an "extension list", which is used to store additional information for an image. In the present invention, audio information associated with each image is stored in an extension list in that image's FlashPix file. More information on the FlashPix file format can be found in "FlashPix Format Specification", version 1.0.1 (1996, 1997), the contents of which are hereby incorporated by reference into the subject application.

FIG. 2 shows the internal construction of computing equipment 1. As shown in FIG. 2, computing equipment 1 includes a central processing unit (hereinafter "CPU") 24 interfaced with computer bus 26. Also interfaced with computer bus 26 are scanner interface 27, network interface 29, fax/modem interface 30, display interface 31, printer interface 32, keyboard interface 34, digital camera interface 35, pointing device (mouse) interface 36, microphone interface 37, and speaker interface 39. Each of these provides an interface between programs executing on CPU 24 and a respective hardware device. In this regard, digital camera interface 35 and scanner interface 27 preferably comprise a TWAIN interface to computing equipment 1. Disk 16 (described above) and main memory 40 are also interfaced to computer bus 26.

Main memory 40 provides random access memory ("RAM") storage for use by CPU 24 when executing software, such as application programs 19 and process steps 21 noted above. More specifically, CPU 24 loads these application programs/process steps from disk 16 into main memory 40 and executes the stored programs/process steps out of main memory 40.

At this point, it should be noted that although a programmable general-purpose computer arrangement is shown in FIGS. 1 and 2, a dedicated or stand-alone computer, or other type of data processing equipment, can be used in the practice of the present invention.

Figure 3:
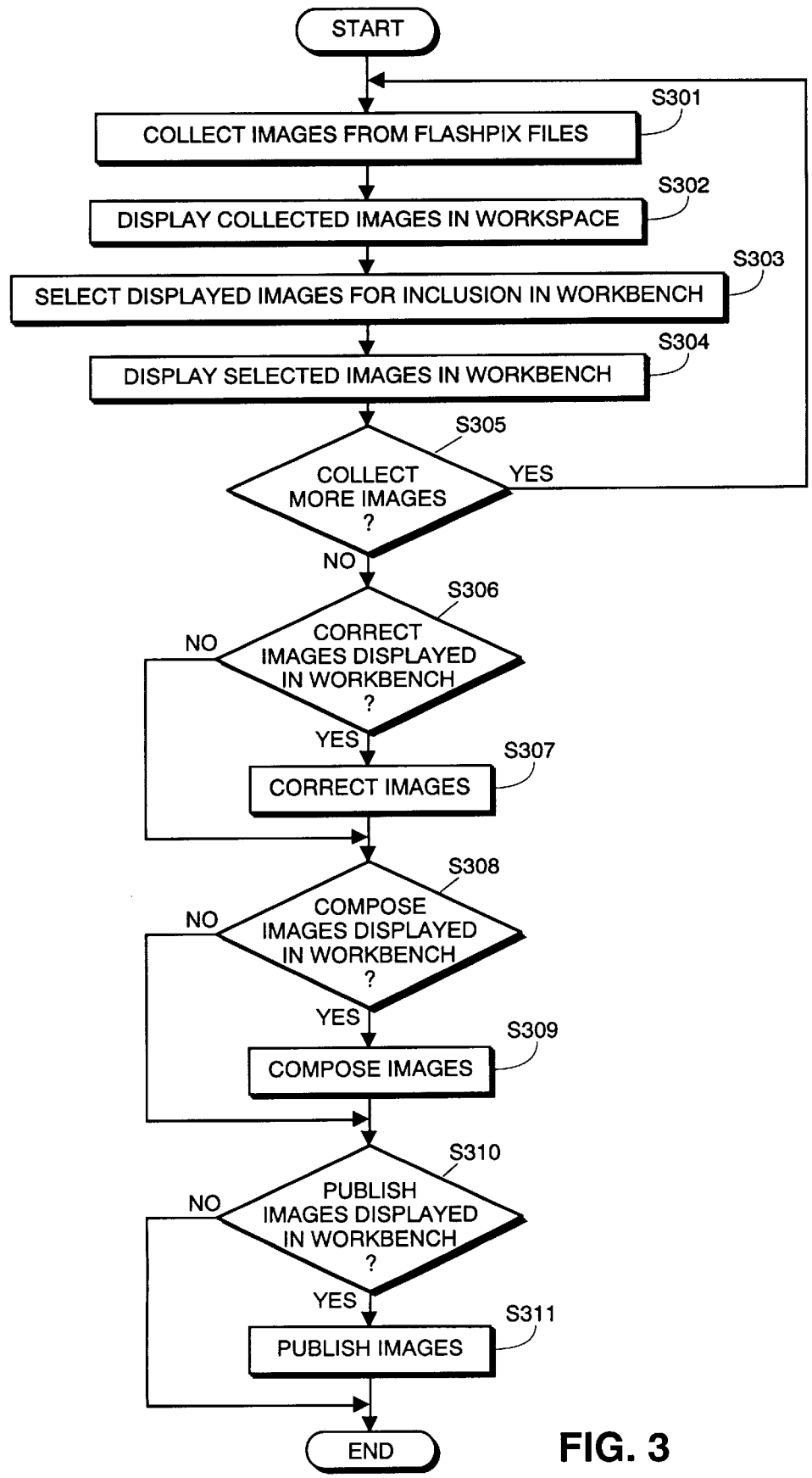
FIG. 3 is a flowchart of process steps comprising the multimedia application of the present invention.
Figure 4:
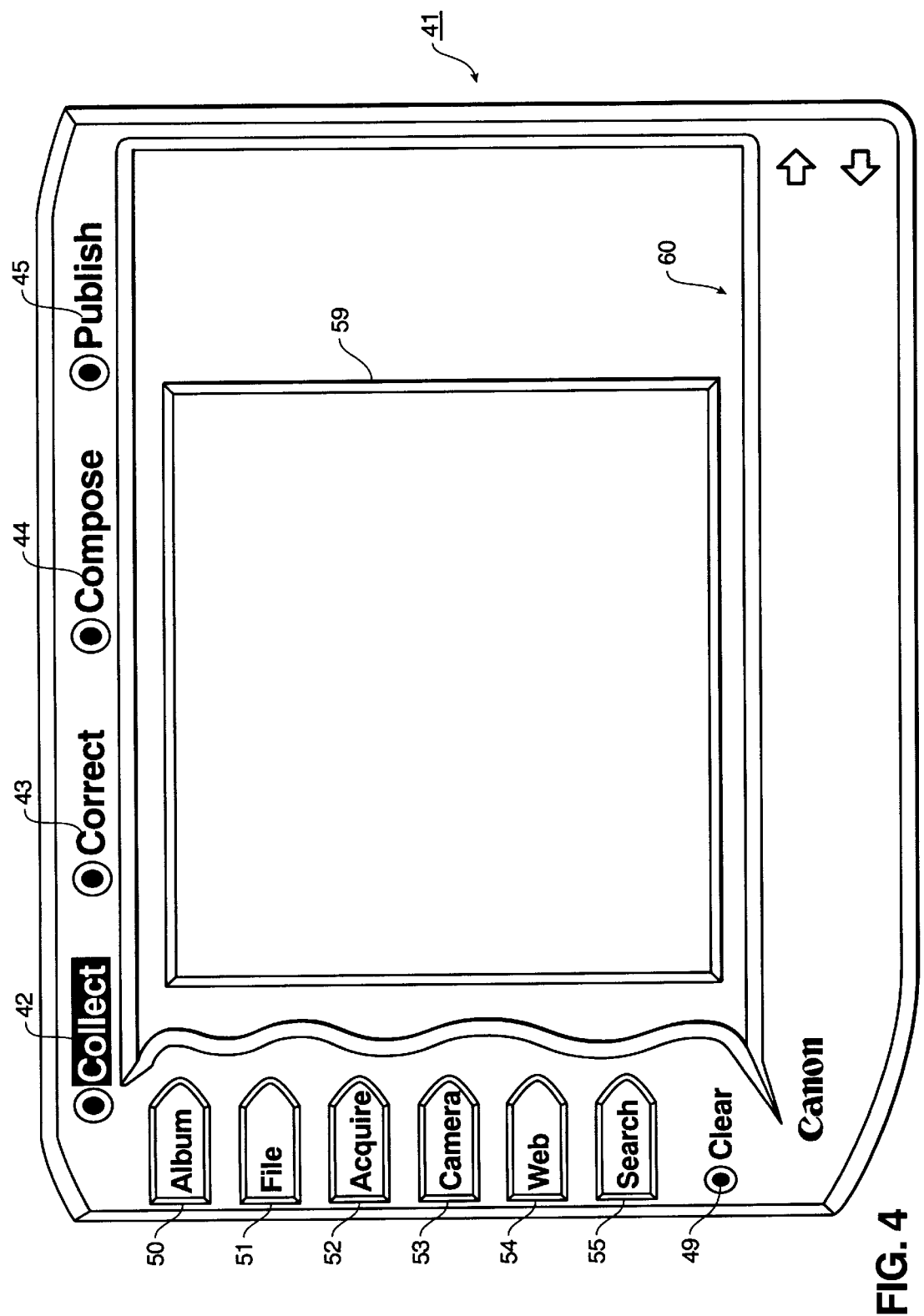
FIG. 4 shows an example of a graphical user interface used by the present invention to collect images from a plurality of sources.

FIG. 3 shows a flow diagram of multimedia application process steps 21 for processing images in accordance with the present invention. Process steps 21 are preferably stored on disk 16, as noted above, and are preferably executed by CPU 24 out of main memory 40.

Briefly, process steps 21 are for use on a computer system, to create and to publish a set of images, each image in the set being stored in a FlashPix file which contains at least the image in multiple resolutions, viewing parameters for viewing the image, and information related to the image. Process steps 21 include code to collect a plurality of images (preferably low resolution images) from FlashPix files, code to display the plurality of collected images on a computer-generated workspace, and code to select, from the images displayed on the computer-generated workspace, a plurality of the images for inclusion onto a computer-generated workbench. Also included in process steps 21 are code to display, on the workbench, a plurality of the images selected from the workspace, and code to correct images displayed in the workbench, the code to correct images comprising code to alter viewing parameters in FlashPix files corresponding to the displayed images. Next, the process steps include code to compose displayed images by adding or deleting, from FlashPix files corresponding to the displayed images, information related to the displayed images, and code to publish a set of composed and/or corrected images displayed on the workbench.

Image Collection

In more detail, step S301 comprises collecting one or more images from FlashPix files obtained from one or more of a plurality of different sources. These sources can include, but are not limited to, external hardware devices (e.g., a camera, a scanner, etc.), individual files stored on disk 16 or elsewhere, an electronic album stored on disk 16 or elsewhere, the World Wide Web, and an external or internal database. Retrieval and manipulation of information, including images, from such FlashPix files during the collection process is performed using commands provided by the Enhanced FlashPix Application Programming Interface, developed by Canon Information Systems, Inc. This Enhanced FlashPix implementation is described in copending U.S. application Ser. No. (08/944,830), entitled "Application Programming Interface For Manipulating FlashPix Files", the contents of which are hereby incorporated by reference into the subject application as if set forth herein in full.

In preferred embodiments of the invention, step S301 collects a lowest resolution image stored in each FlashPix file. It should be noted, however, that this need not be the case, and that any resolution image may be collected in step S301. In addition, in preferred embodiments of the invention, step S301 collects, from FlashPix files, other information that is associated with the images, such as information indicating that an image includes audio information, text, etc.

To illustrate the collection process of step S301, reference is made to FIGS. 4 to 10, which show representative embodiments of a graphical user interface (hereinafter "GUI") that may be generated by process steps 21. As shown in the figures, GUI 41 includes radio buttons 42 to 45, labelled "Collect", "Correct", "Compose", and "Publish", respectively. For the purpose of describing step S301, focus will be on "Correct" radio button 42. Radio buttons 43 to 45 are described in more detail below in connection with others of process steps 21.

To begin, in step S301, a user selects "Collect" radio button 42 by, e.g., clicking thereon using pointing device 7. This causes "Collect" radio button to be highlighted, as shown in FIGS. 4 to 10. Selection of "Collect" radio button 42 also causes "Clear" radio button 49 to be displayed, as shown in FIGS. 4 to 10, along with tool belt buttons 50 to 55, labelled "Album", "File", "Acquire", "Camera", "Web", and "Search", respectively. These buttons are preferably displayed automatically on the left side of GUI 41, and initiate the functions described below.

As shown in FIGS. 4 to 10, GUI 41 includes computer-generated workspace 59, which displays images collected by collecting step S301. Preferably these images are displayed as thumbnail versions of original, larger sized images, as described below. GUI 41 also includes computer-generated workbench 60, which displays images selected from workspace 59. Use of workspace 59 and workbench 60 is described in more detail below.

Figure 5:
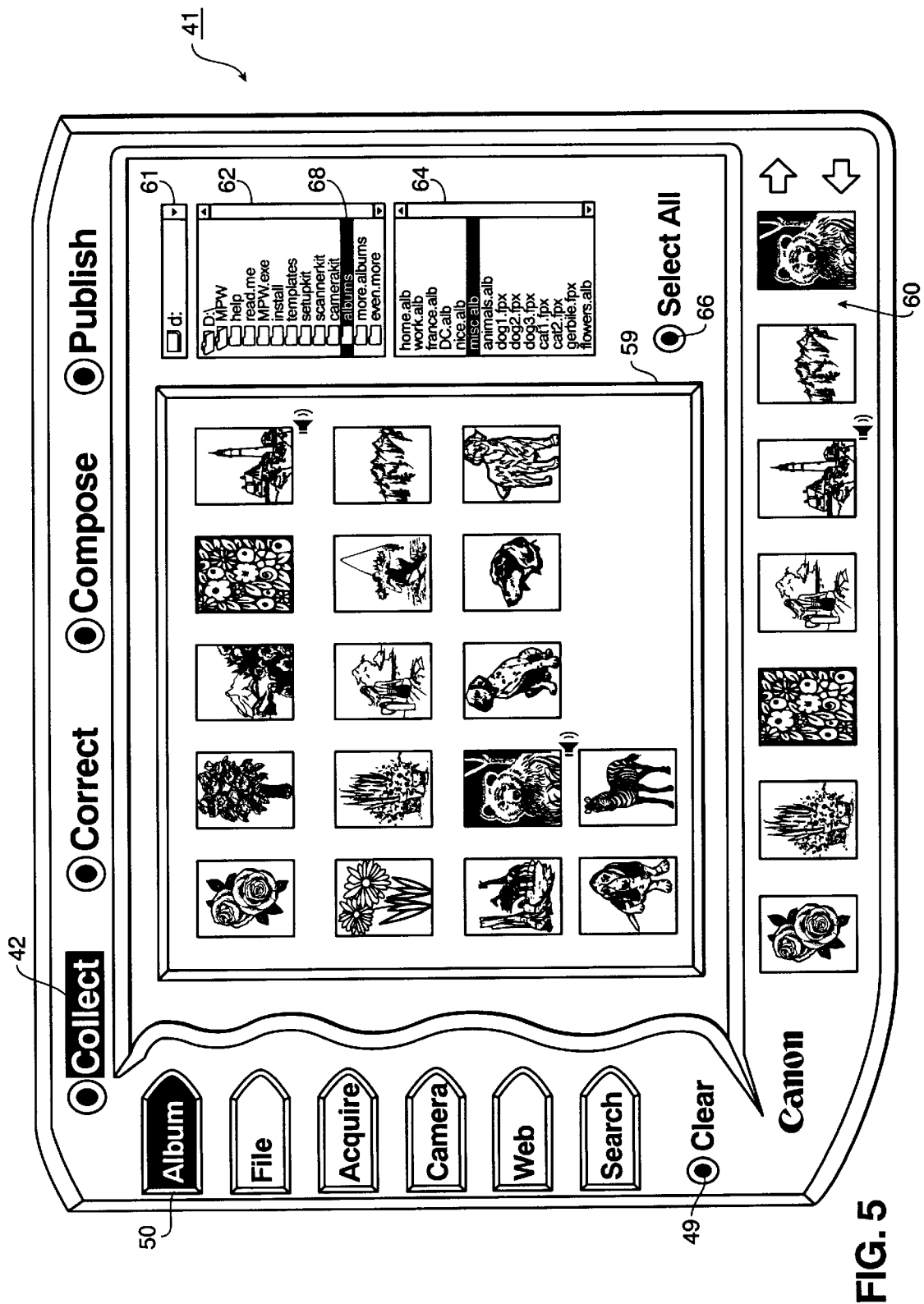
FIG. 5 shows the graphical user interface of FIG. 4 configured to collect images from an electronic album.

With regard to collecting step S301, FIG. 5 shows the configuration of GUI 41 during collection of FlashPix images from a previously-stored electronic album of images. As background, such an album is generally a single ".alb" file, and includes pointers to a plurality of FlashPix images. The process of collecting images from an electronic album is initiated by selecting "Album" button 50 using, e.g., pointing device 7. As shown in FIG. 5, once "Album" button 50 has been selected, "Album" button 50 is highlighted to indicate that it has been selected.

Upon selection of "Album" button 50, windows 61, 62 and 64 are displayed, along with "Select all" radio button 66. "Select all" radio button 66 is used to select images displayed on workspace 59 for reasons described below.

Regarding the windows, window 61 displays a current disk drive, and window 62 displays the current directory on that disk drive, including folders and files stored therein.

In the example shown in FIG. 5, album folder 68 is stored on the "d" drive (see window 61) in the "D" directory (see window 62). In this example, album folder 68 is selected, thereby causing window 64 to appear, as shown in FIG. 5. Window 64 displays a list of albums (i.e., ".alb" files) which are stored within album folder 68. These albums each include pointers to individual FlashPix files containing images which are collected by step S301.

Figure 6:
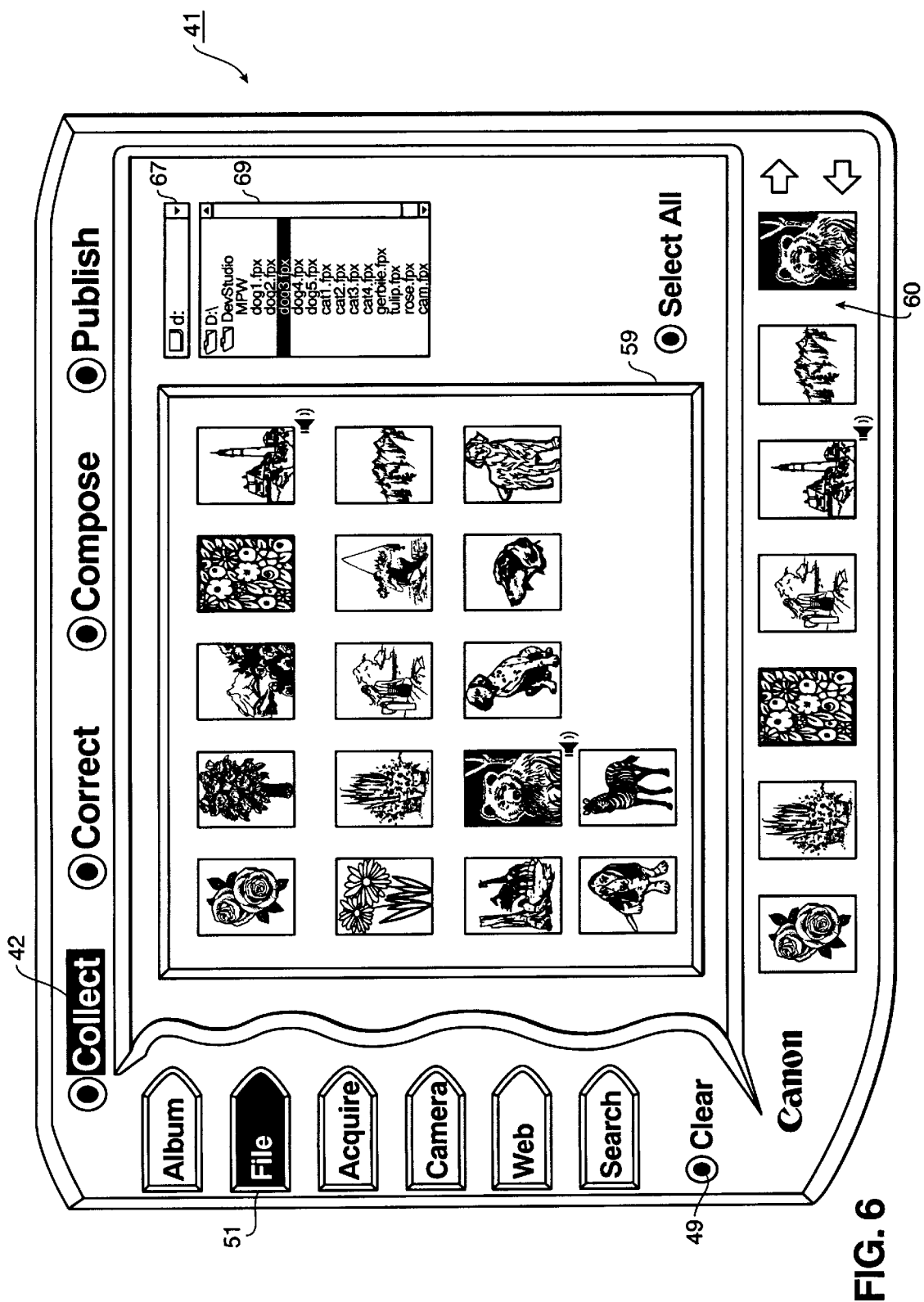
FIG. 6 shows the graphical user interface of FIG. 4 configured to collect images from previously-stored files.

FIG. 6 shows the configuration of GUI 41 during collection of FlashPix images from previously-stored image files. The process of collecting images from previously-stored image files is initiated by selecting "File" button 51 using, e.g., pointing device 7. As shown in FIG. 6, once "File" button 51 has been selected, "File" button 51 is highlighted to indicate that it has been selected.

Upon selection of "File" button 51, windows 67 and 69 are displayed. Window 67 displays a current disk drive and window 69 displays a current directory, including folders and files stored therein. Unlike in FIG. 5, where pointers to plural images were stored in a single "album" file, in this case, each file stores a single (".fpx") image. Thus, in this case, step S301 collects images from individual files displayed in window 69, rather than from a single album file that references plural images.

Figure 7:
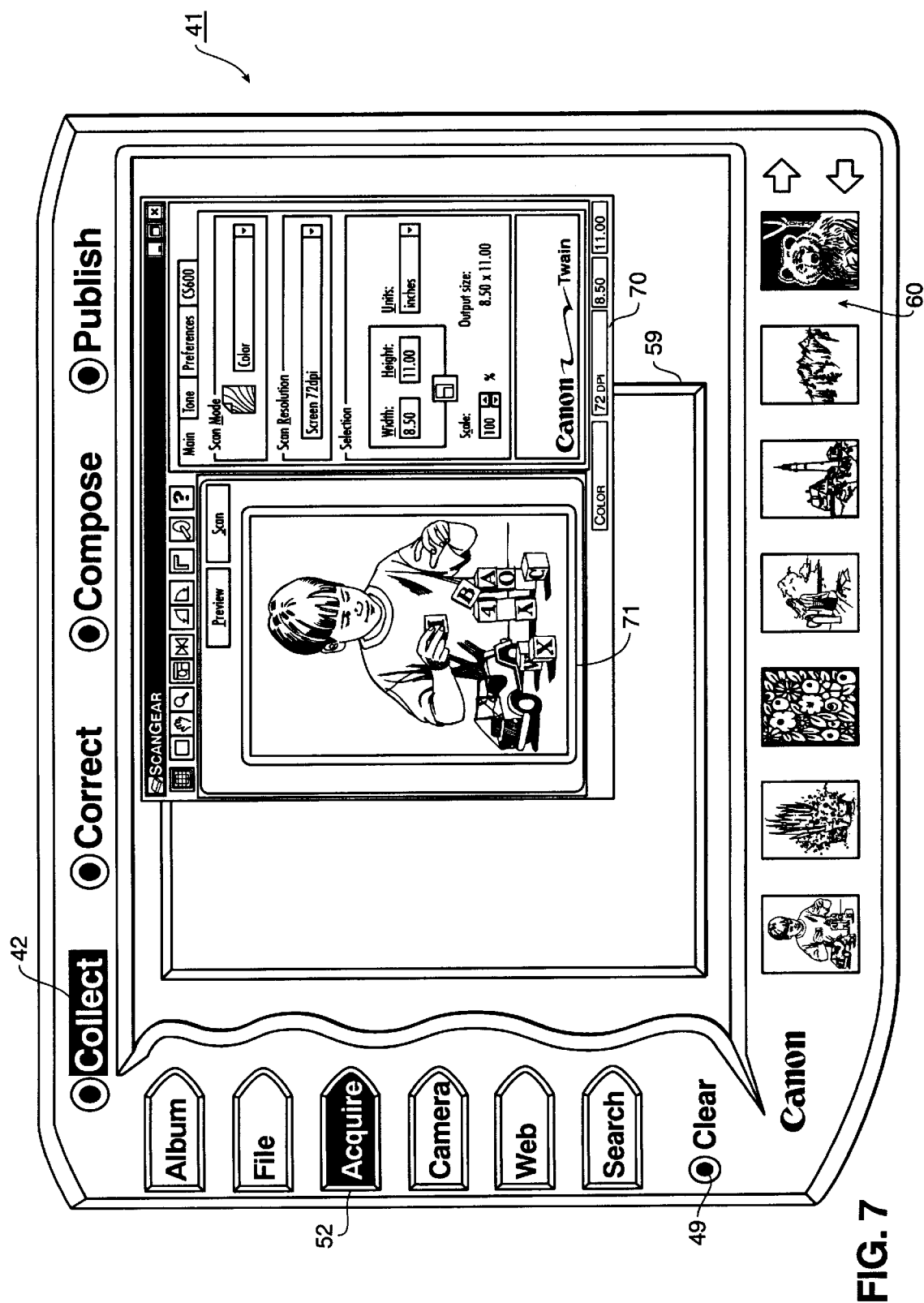
FIG. 7 shows the graphical user interface of FIG. 4 configured to collect images from a scanner.

FIG. 7 shows the configuration of GUI 41 during collection of FlashPix images from an image acquisition device, such as a scanner, using a TWAIN interface to computing equipment 1. This process is initiated by selecting "Acquire" button 52 using, e.g., pointing device 7. As shown in FIG. 7, once "Acquire" button 52 has been selected, "Acquire" button 52 is highlighted to indicate that it has been selected.

Upon selection of "Acquire" button 52, window 70 is displayed. Window 70 provides the user with input options that are available for the image acquisition device, which in this case is a scanner. In the example shown in FIG. 7, options for the scanner are preferably accessed by an application program, namely ScanGear, which, as noted above, is stored on disk 16. As shown, ScanGear allows a user to vary options, including scan resolution, image size, image scale, etc., during collection in step S301.

Once desired options are set in window 70, ScanGear begins acquiring image 71 in response to an input command. In preferred embodiments of the invention, the scanner acquires the image in a FlashPix format file. In a case that the scanner does not acquire the image in FlashPix format, preferred embodiments of the present invention convert the acquired image into FlashPix format prior to collecting step S301. Once image 71 is input, collecting step S301 collects image 71.

Figure 8:
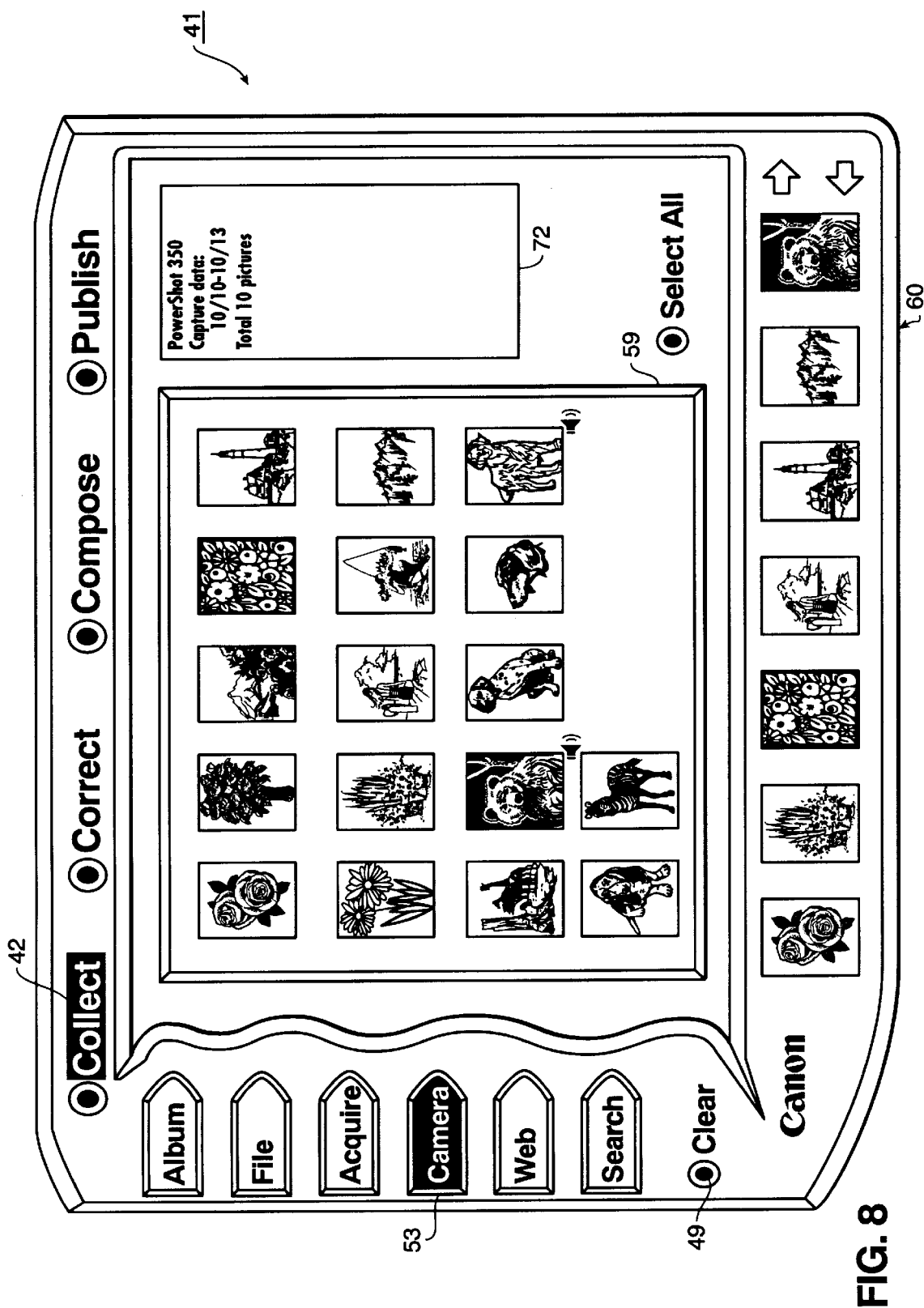
FIG. 8 shows the graphical user interface of FIG. 4 configured to collect images from a camera.

FIG. 8 shows the configuration of GUI 41 during collection of FlashPix images from a digital camera. This process is initiated by selecting "Camera" button 53 using, e.g., pointing device 7. As shown in FIG. 8, once "Camera" button 53 has been selected, "Camera" button 53 is highlighted to indicate that it has been selected.

Upon selection of "Camera" button 53, window 72 is displayed, and step S301 collects images and, in preferred embodiments, other information, from a camera. Window 72 provides the user with this other information which, in this case, includes the model of the camera (i.e., "PowerShot 350"), the capture dates of the images (i.e., "10/10–10/13"), and the total number of pictures from the camera (i.e., "Total 10 pictures").

As was the case above, in preferred embodiments of the invention, the camera inputs the images as FlashPix files. In a case that the camera does not input images in FlashPix format, preferred embodiments of the present invention will convert the input images into FlashPix format prior to collecting step S301.

Figure 9:
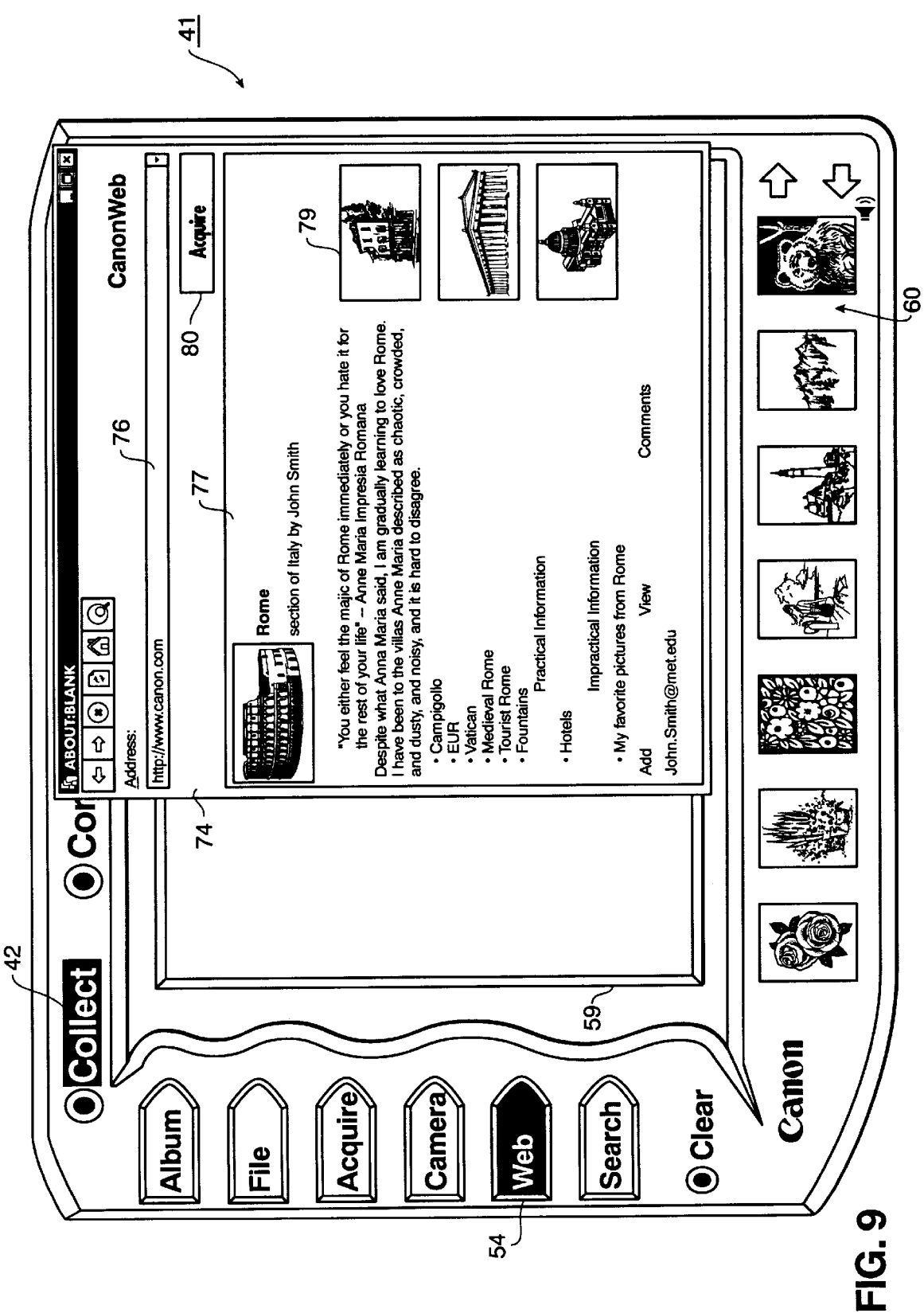
FIG. 9 shows the graphical user interface of FIG. 4 configured to collect images from the World Wide Web.

FIG. 9 shows the configuration of GUI 41 during collection of FlashPix images from the World Wide Web. This process is initiated by selecting "Web" button 54 using, e.g., pointing device 7. As shown in FIG. 9, once "Web" button 54 has been selected, "Web" button 54 is highlighted to indicate that it has been selected.

Upon selection of "Web" button 54, Web browser 20 is executed, which provides the user with access to the World Wide Web via browser interface 74. Specifically, to access a Web page, the user enters a uniform resource locator ("URL") in "Address" line 76 of browser interface 74. A Web page, such as web page 77, is then retrieved and displayed in the display area of browser interface 74.

To acquire one or more images from web page 77, the user has two options. First, to select a particular image from the Web page, such as image 79, the user can simply point to the image using pointing device 7, and then click on the image. To select all of the images on a Web page at once, the user can simply click on browser acquire button 80.

Once one or more images have been selected from Web page 77 using either of the foregoing options, the invention uses Internet Imaging Protocol (hereinafter "IIP") to collect a particular (e.g., low) resolution image from a FlashPix file corresponding to the selected images. At this point, it should be noted that if the selected images are not currently in FlashPix format, the invention may collect the image "as is", which typically means collecting the image in JPEG format.

Following collection of an image from a FlashPix file on the World Wide Web, the invention maintains the link to the FlashPix file using IIP so that a different (e.g., higher) resolution image can be obtained at a later time. This process is described in more detail below.

Figure 10:
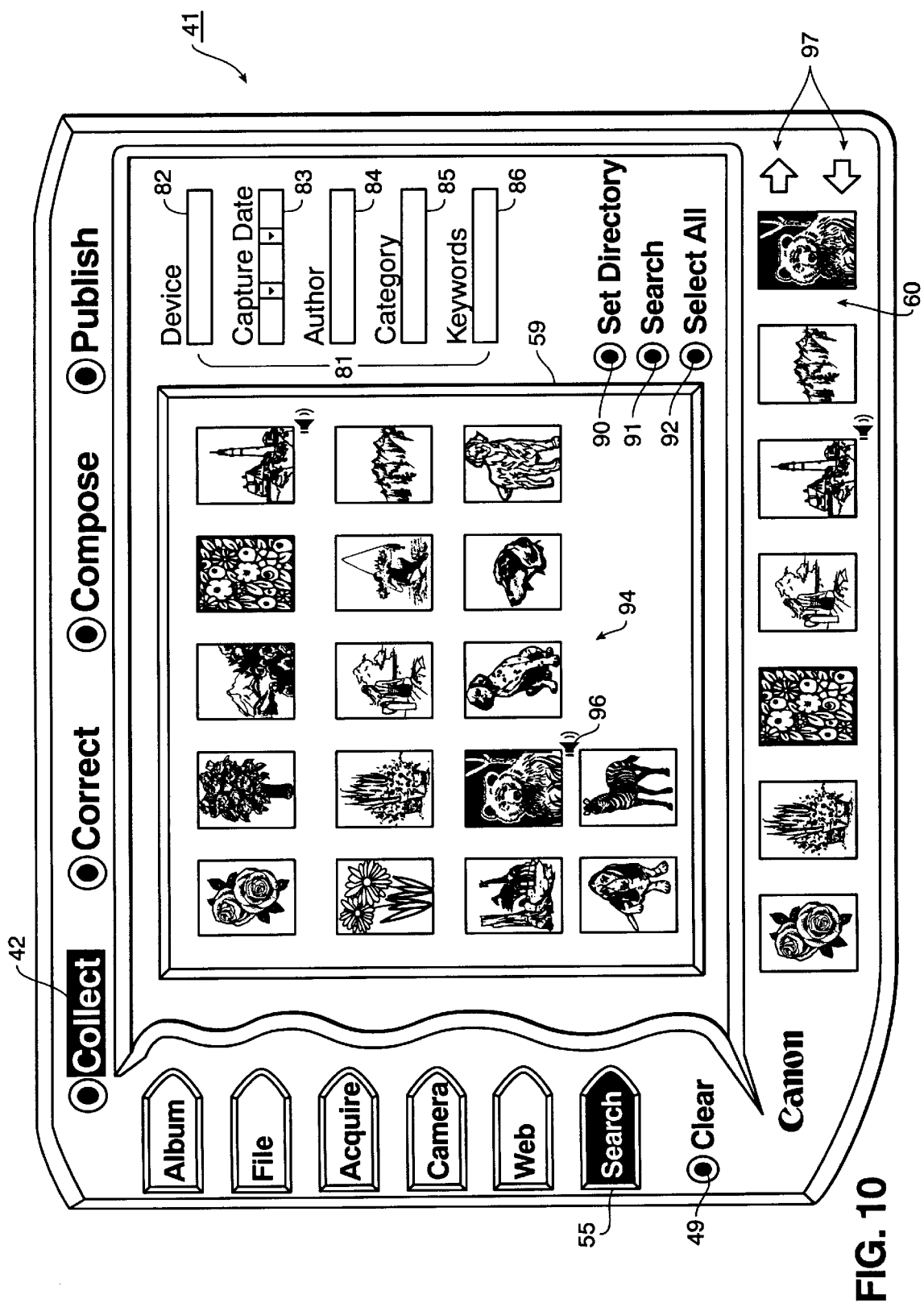
FIG. 10 shows the graphical user interface of FIG. 4 configured to collect images based on designated searching parameters.

FIG. 10 shows GUI 41 configured to search for particular images using designated search parameters. More specifically, in this case, step S301 searches for information in FlashPix files using designated search parameters, and then collects images from files found as a result of the search. This process is initiated by selecting "Search" button 55 using, e.g., pointing device 7. As shown in FIG. 10, once "Search" button 55 has been selected, "Search" button 55 is highlighted to indicate that it has been selected.

Upon selection of "Search" button 55, entry lines 81 are provided, into which a user may enter parameters to search for FlashPix images having specific information associated therewith. That is, in preferred embodiments, the invention performs word searches in the images' FlashPix files for the parameters entered in entry lines 81. These entry lines include "Device" line 82, "Capture date" line 83, "Author" line 84, "Category" line 85, and "Keywords" line 86.

In accordance with the invention, a user may enter a particular device, such as a "camera", into "Device" line 82, in order to make the invention search FlashPix files for images captured by a camera. A user may enter a particular capture date, such as a "2/19/97", into "Capture date" line 83, in order to make the invention search FlashPix files for images captured on Feb. 19, 1997. A user may enter a particular author, such as a "John Smith", into "Author" line 84, in order to make the invention search FlashPix files for images captured by John Smith. A user may enter a particular category, such as a "dogs", into "Category" line 85, in order to make the invention search FlashPix files for images of dogs. A user may enter a particular keyword, which can comprise any character string, into "Keywords" line 86, in order to make the invention search FlashPix files for that particular character string.

It should be noted that entries may be made into more than one of entry lines 81 in order to conduct a search using plural search parameters. In such cases, in preferred embodiments of the invention, these additional search parameters broaden the search. That is, the invention searches for images which have one or more of the designated search parameters, and not just for images having both parameters. For example, if "dogs" is entered into "Category" entry line 85, and "John Smith" is entered into "Author" entry line 84, searching by the invention will find all images by "John Smith", all images of "dogs", and all images of "dogs" by "John Smith".

Alternative embodiments, however, can be designed which narrow a search by adding more search parameters. That is, with regard to the example described above, in these alternative embodiments, conducting a search in which "dogs" is entered into "Category" entry line 85 and "John Smith" is entered into "Author" entry line 84 would cause the invention to find only all images of "dogs" by "John Smith".

In addition to displaying entry lines 81, upon selection of "Search" button 55 the invention also displays radio buttons 90 to 92, labelled "Set Directory", "Search" and "Select all", respectively. "Set Directory" radio button 90 allows a user to set a directory in which a search is to be conducted. This can be done via a window (not shown), such as window 62 shown in FIG. 5. "Search" radio button 91 allows a user to begin a search after one or more search parameters have been entered into entry lines 81. "Select all" radio button 92, which also appears in FIGS. 5, 6 and 8, is described below with respect to step S303. Accordingly, a description thereof is omitted here for the sake of brevity.

Finally, as shown in FIGS. 4 to 10, upon selection of "Collect" radio button 42, the invention also displays "Clear" radio button 49 in the lower left corner of GUI 41. "Clear" radio button 49, when selected, clears collected images displayed in workspace 59.

Returning to FIG. 3, following image collection by one of the foregoing methods, step S302 displays the collected images on computer-generated workspace 59. Workspace 59 is generated by process steps 21, and comprises a display area for displaying thumbnail versions 94 of the images collected in step S301. Examples of thumbnail images 94 displayed in workspace 59 by step S302 are shown, for example, in FIG. 10.

In preferred embodiments of the invention, the thumbnail images displayed in workspace 59 comprise a lowest resolution image stored in a FlashPix file for each image. By displaying a lowest resolution image from each FlashPix file, the present invention reduces the amount of time that it takes to display the set of thumbnail images. However, it should be noted that, in the present invention, it is not necessary to display the lowest resolution image from a FlashPix file, and that any resolution image may be displayed in workspace 59.

In addition to displaying images, workspace 59 can display information associated with each image, such as text or audio icon 96 shown in FIG. 10. Thus, in accordance with the invention, it is possible to determine, simply by looking at workspace 59, whether an image includes, e.g., associated audio or other information.

With regard to FIGS. 7 and 9, it is noted that although the images shown in these figures are not shown as being displayed in workspace 59, this is done merely for ease of description. Following their collection, thumbnail versions of the images shown in FIGS. 7 and 9 also may be displayed in workspace 59 in step S302.

Following step S302, processing proceeds to step S303, which selects images displayed on workspace 59 for inclusion onto computer-generated workbench 60. As background, workbench 60 displays images (preferably, low resolution, thumbnail images) which have been collected from one or more sources. As shown in FIG. 10, in addition to displaying images, workbench 60 includes scroll arrows 97, which permit a user to scroll through all images in an album in a case that all images in the album do not fit within a visible portion of workbench 60.

In preferred embodiments of the invention, pointing device 7 is used to select images from workspace 59 for inclusion onto workbench 60. In these embodiments, an image can be included on workbench 60 simply by pointing to the image on workspace 59 and clicking on the image. Thus, according to the invention, it is possible to select some or all of the images displayed on workspace 59 for inclusion onto workbench 60. To facilitate selection, the invention also includes "Select all" radio button 92, shown, e.g., in FIG. 10. "Select all" radio button 92 is used to select, for inclusion onto workbench 60, all images displayed on workspace 59.

Once an image from workspace 59 has been selected for inclusion onto workbench 60, step S304 displays the image on workbench 60. Following display of images on workbench 60, processing proceeds to step S305. Step S305 determines whether additional images are to be collected, e.g., from different sources, and also included onto workbench 60. In a case that additional images are to be collected, processing returns to step S301. However, in a case that additional images are not to be collected, processing proceeds to step S306.

Thus, to summarize, following steps S301 to S305, a plurality of images, collected from one or more sources, are displayed on workbench 60. These images are preferably low resolution, thumbnail images, and are all to be included within a single set of images, such as an electronic album, a slide show, etc.

Image Correction

Next, step S306 determines whether images displayed in workbench 60 are to be corrected. Since correction for all images may not be necessary, image correction is optional. Thus, in a case that image correction is not to be performed, processing proceeds to step S308, which is described below.

In a case that step S306 determines that image correction is to be performed, processing proceeds to step S307. Step S307 corrects (i.e., edits) images displayed on workbench 60. As noted above, FlashPix files store an image in multiple resolutions, along with viewing parameters comprising transformations and the like which affect how the image is displayed. Thus, when a FlashPix image is corrected, as in step S307, viewing parameters in the FlashPix file corresponding to the image are changed, but the raw image data for the image itself is not changed.

To illustrate the correction process of step S307, reference is made to FIGS. 11 to 16. FIGS. 11 to 16 show embodiments of GUI 41 that are generated by process steps 21 in order to facilitate image correction.

Figure 11:
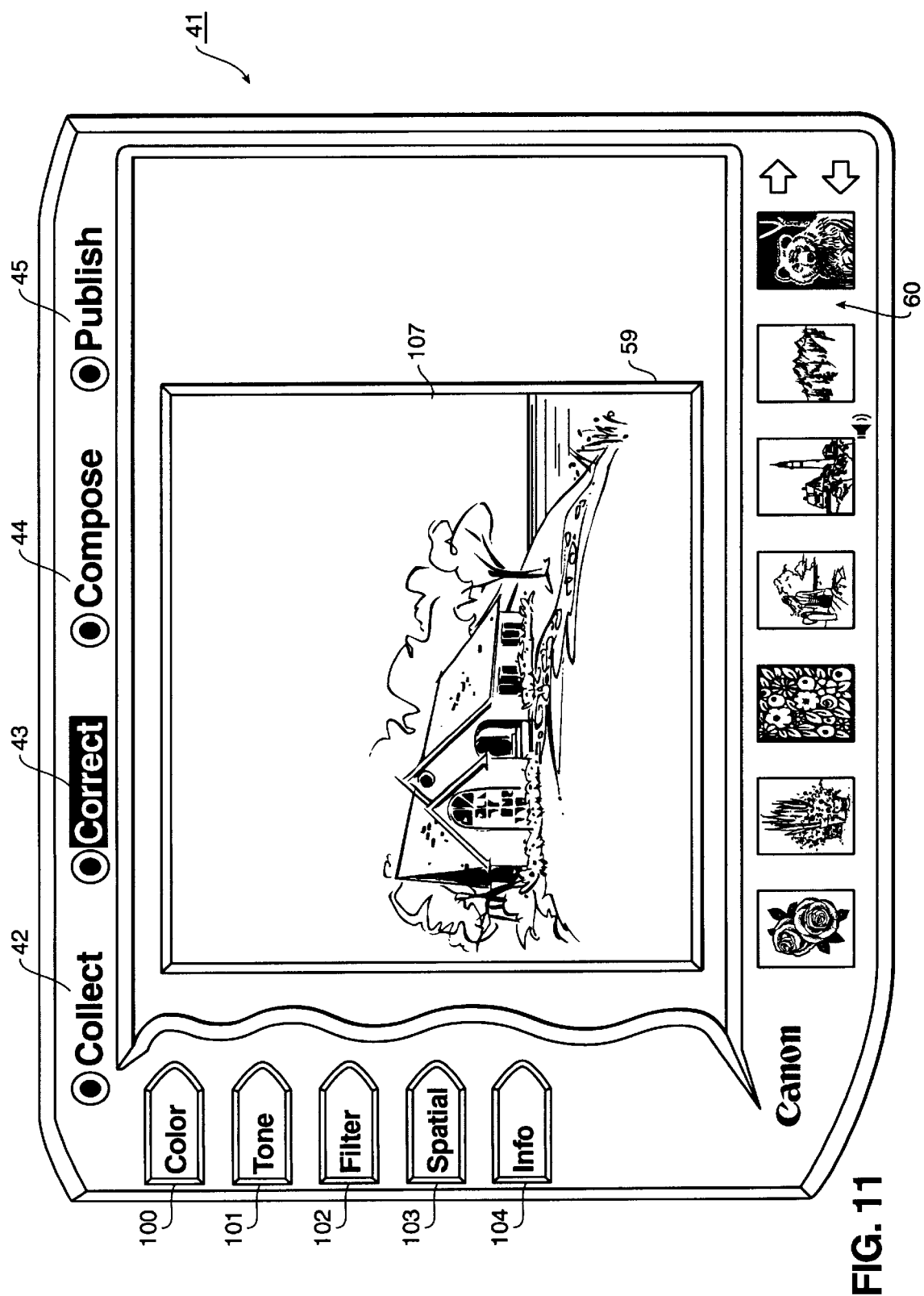
FIG. 11 shows an example of a graphical user interface used by the present invention to correct collected images.

Thus, to begin correction in step S307, a user selects "Correct" radio button 43 by, e.g., clicking thereon using pointing device 7. This causes "Correct" radio button 43 to be highlighted, as shown in FIGS. 11 to 16. Selection of "Correct" radio button 43 also causes display of tool belt buttons 100 to 104, labelled "Color", "Tone", "Filter", "Spatial", and "Info", respectively, as shown in FIG. 11. These buttons, which are preferably displayed automatically on the left side of GUI 41, each correspond to a different type of correction which can be performed on an image. Specific functions of the tool belt buttons are described in more detail below.

Once tool belt buttons 100 to 104 have been displayed, a user then selects from workbench 60 an image that is to be corrected. Preferably, this is done by pointing to an image displayed on workbench 60 using pointing device 7, and then clicking on the image. Selection of an image in this manner causes a full-size version of the selected image to be displayed on workspace 59, as shown in FIG. 11. To display this image, the invention retrieves a version of the image from the FlashPix file for that image. Image 107, shown in FIG. 11, is an example of an image selected from workbench 60 that is displayed on workspace 59.

Figure 12:
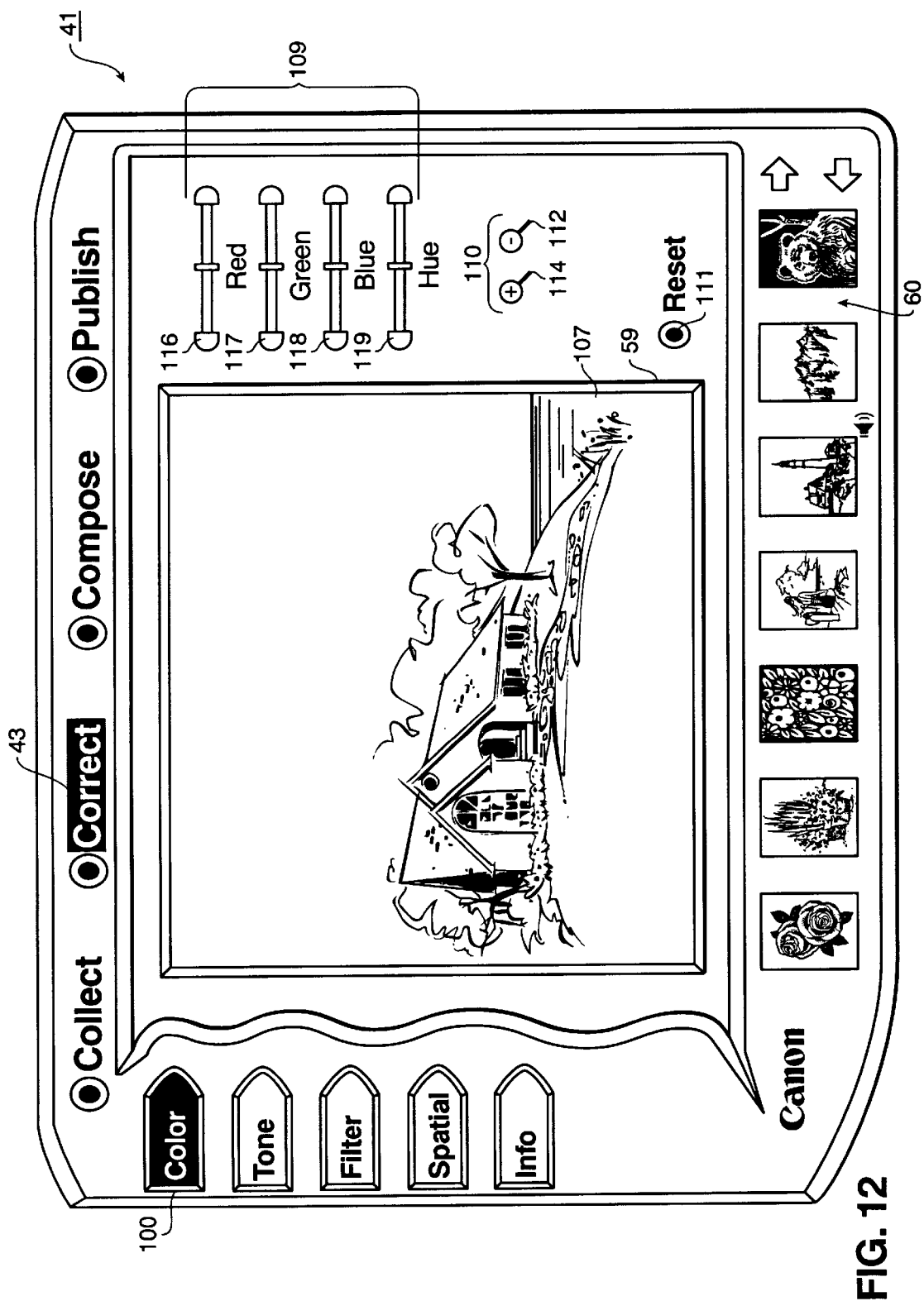
FIG. 12 shows the graphical user interface of FIG. 11 configured to correct image color.

Following display of a selected image on workspace 59, correction of the image can begin. Specifically, if correction of colors in image 107 is desired, "Color" button 100 is selected using, e.g., pointing device 7. As shown in FIG. 12, once "Color" button 100 has been selected, "Color" button 100 is highlighted to indicate that it has been selected.

As shown in FIG. 12, upon selection of "Color" button 100, GUI 41 displays color controls 109, magnification controls 110, and "Reset" radio button 111. Color controls 109 may be used to change viewing parameters in the FlashPix file for image 107. That is, as noted above, changes to an image made via GUI 41 comprise changes to viewing parameters in the image's FlashPix file, and not changes to raw data for the image. In contrast to color controls 109, which can be used to change viewing parameters for an image, magnification controls 110 and "Reset" radio button 111 are editing tools which facilitate image correction, but do not change image viewing parameters.

More specifically, zoom-out magnification control 112 causes a decrease in magnification of the image. Zoom-in magnification control 114 causes an increase in magnification of a portion of the image. In preferred embodiments of the invention, this zoom-in feature magnifies the image relative to the center of the image, and then scroll bars (not shown) are displayed which enable the user to move to other areas of the image. Alternative embodiments of the invention permit the user to select a particular point on a displayed image using pointing device 7, and to zoom-in on the image relative to the selected point.

Regarding color controls 109, "Red" control 116 controls the intensity of red color in image 107; "Green" control 117 controls the intensity of green color in image 107; "Blue" control 118 controls the intensity of blue color in image 107; and "Hue" control 119 varies color hues in image 107. Specifically, "Hue" control 119 changes all or some colors in an image to other, preset colors.

At this point, it should be noted that as color and magnification settings are altered on GUI 41, corresponding features of image 107 shown in workspace 59 are also altered. For example, if the intensity of red is increased using "Red" control 116, the intensity of red in displayed image 107 will increase. However, these changes are not automatically saved in image 107's FlashPix file. Rather a "save" command must be input, via a pull-down menu or the like (not shown), in order to save changes to the image's FlashPix file made via GUI 41.

In this regard, "Reset" radio button 111, when selected, undoes all changes to an image displayed in workspace 59 which have been made during a particular correction process. For example, if "Reset" radio button 111 is activated during tone correction, but before saving tone changes, an image displayed in workspace 59 will revert to the form of the image prior to beginning tone correction. However, in this case, prior changes to the image during color correction, for example, would be maintained during activation of "Reset" radio button 111 during tone correction. Of course, in order to retain any such changes, it is necessary to save the changes, as described above.

Following color correction of image 107, a new image can be selected for correction by pointing and clicking on an image in workbench 60. This causes image 107 displayed on workspace 59 to be removed and redisplayed on workbench 60. It is noted that the image redisplayed on workbench 60 will include any changes made, and saved, in correcting step S307.

Figure 13:
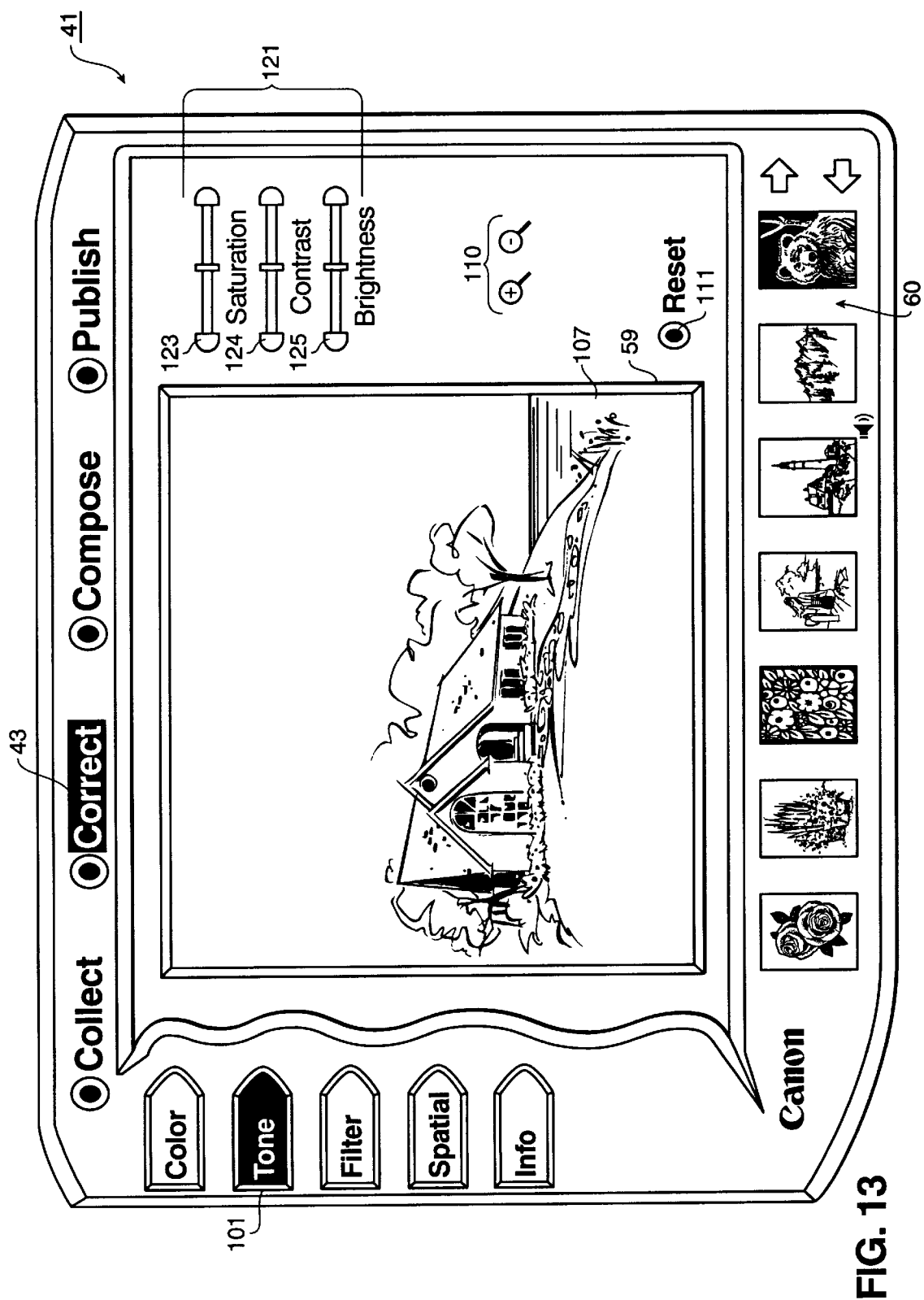
FIG. 13 shows the graphical user interface of FIG. 11 configured to correct image tone.

Returning to FIG. 3, in step S307, if image tone correction is desired, "Tone" button 101 is selected using, e.g., pointing device 7. As shown in FIG. 13, once "Tone" button 101 has been selected, "Tone" button 101 is highlighted to indicate that it has been selected.

As shown in FIG. 13, upon selection of "Tone" button 101, GUI 41 displays tone controls 121, magnification controls 110, and "Reset" radio button 111. Magnification controls 110 and "Reset" radio button 111 are identical to those features described above with respect to FIG. 12. Accordingly a detailed description of these features is omitted here for the sake of brevity.

As was the case above with color controls 109, tone controls 121 may be used to change viewing parameters in a FlashPix file for image 107. Specifically, with reference to FIG. 13, "Saturation" control 123 controls the amount of saturation of each color in image 107; "Contrast" control 124 controls the amount of contrast between colors in image 107; and "Brightness" control 124 controls the brightness of colors in image 107.

As tone and magnification settings are altered on GUI 41, corresponding features of image 107 shown in workspace 59 are also altered. For example, if the brightness setting is changed using "Brightness" control 125, the brightness of displayed image 107 will also change. Such changes, however, are not automatically saved in the FlashPix file for image 107. Rather a "save" command must be input, via a pull-down menu or the like (not shown), in order to save the changes made via GUI 41.

Following tone correction of image 107, a new image can be selected for correction by pointing and clicking on an image in workbench 60. This causes image 107 displayed on workspace 59 to be removed, and redisplayed on workbench 60. The image redisplayed on workbench 60 will include any changes made, and saved, in correcting step S307.

Figure 14:
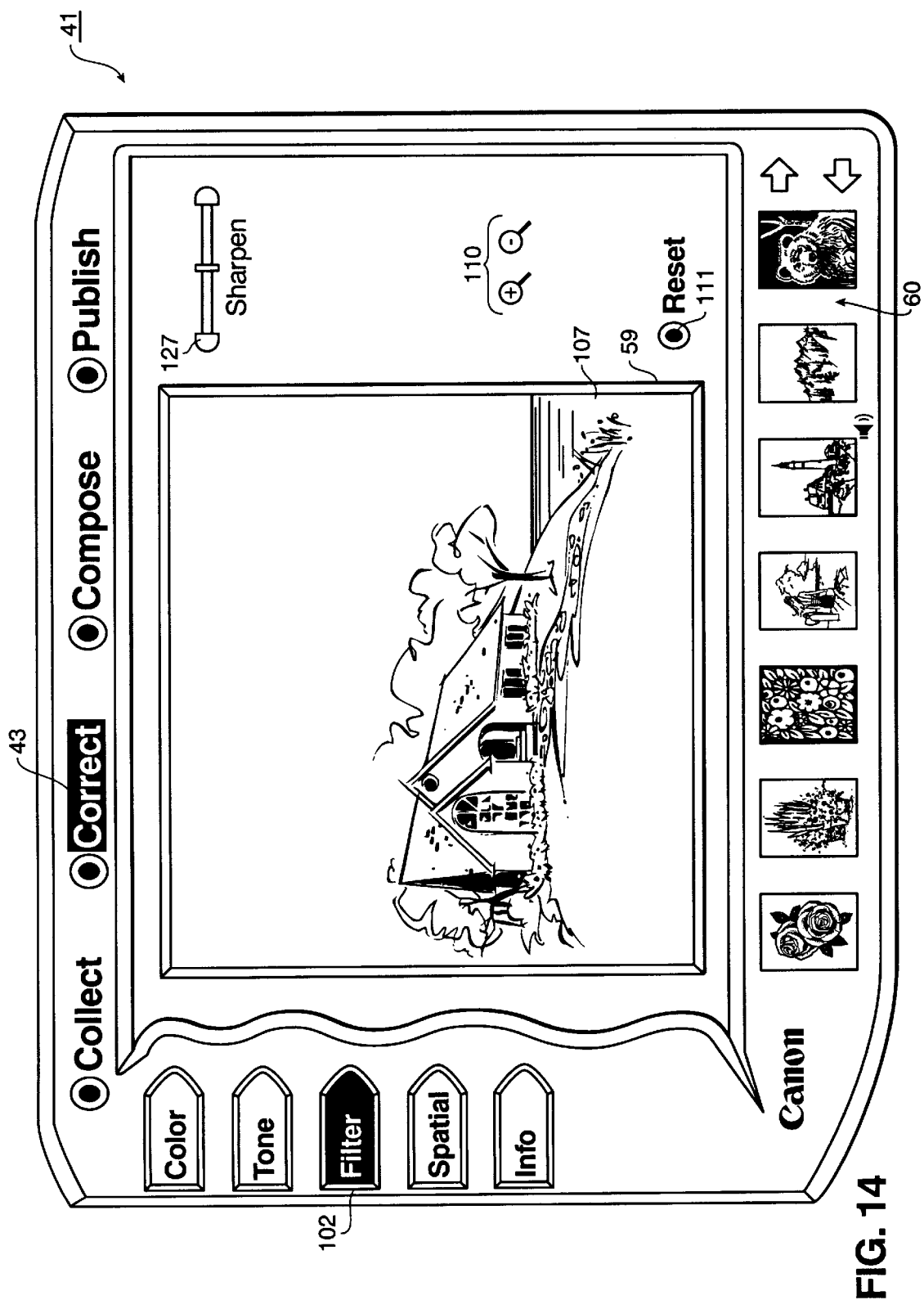
FIG. 14 shows the graphical user interface of FIG. 11 configured to correct image sharpness.

Returning to FIG. 3, in step S307, if sharpness correction of image 107 is desired, "Filter" button 102 is selected using, e.g., pointing device 7. As shown in FIG. 14, once "Filter" button 102 has been selected, "Filter" button 102 is highlighted to indicate that it has been selected.

As shown in FIG. 14, upon selection of "Filter" button 102, GUI 41 displays "Sharpen"/Blur control 127, magnification controls 110, and "Reset" radio button 111. Magnification controls 110 and "Reset" radio button 111 have functions identical to those described above with respect to FIG. 12. Accordingly a detailed description thereof is omitted here for the sake of brevity.

As was the case above with color controls 109, "Sharpen"/Blur control 127 may be used to change viewing parameters in a FlashPix file for image 107. Specifically, with reference to FIG. 14, "Sharpen"/Blur control 127 controls the sharpness of image 107.

As sharpness and magnification settings are altered on GUI 41, corresponding features of image 107 shown in workspace 59 are also altered. That is, if the sharpness setting is changed using "Sharpen"/Blur control 127, the sharpness of displayed image 107 will change correspondingly, i.e., the image will become more sharp or more blurred depending upon the change in the sharpness setting. Such changes, however, are not automatically saved in the FlashPix file for image 107. Rather a "save" command must be input, via a pull-down menu or the like (not shown), in order to save the changes made via GUI 41.

Following sharpness correction of image 107, a new image can be selected for correction by pointing and clicking on an image in workbench 60. This causes the image displayed on workspace 59 to be removed, and redisplayed on workbench 60. The image redisplayed on workbench 60 will include any changes made, and saved, in correcting step S307.

Figure 15:
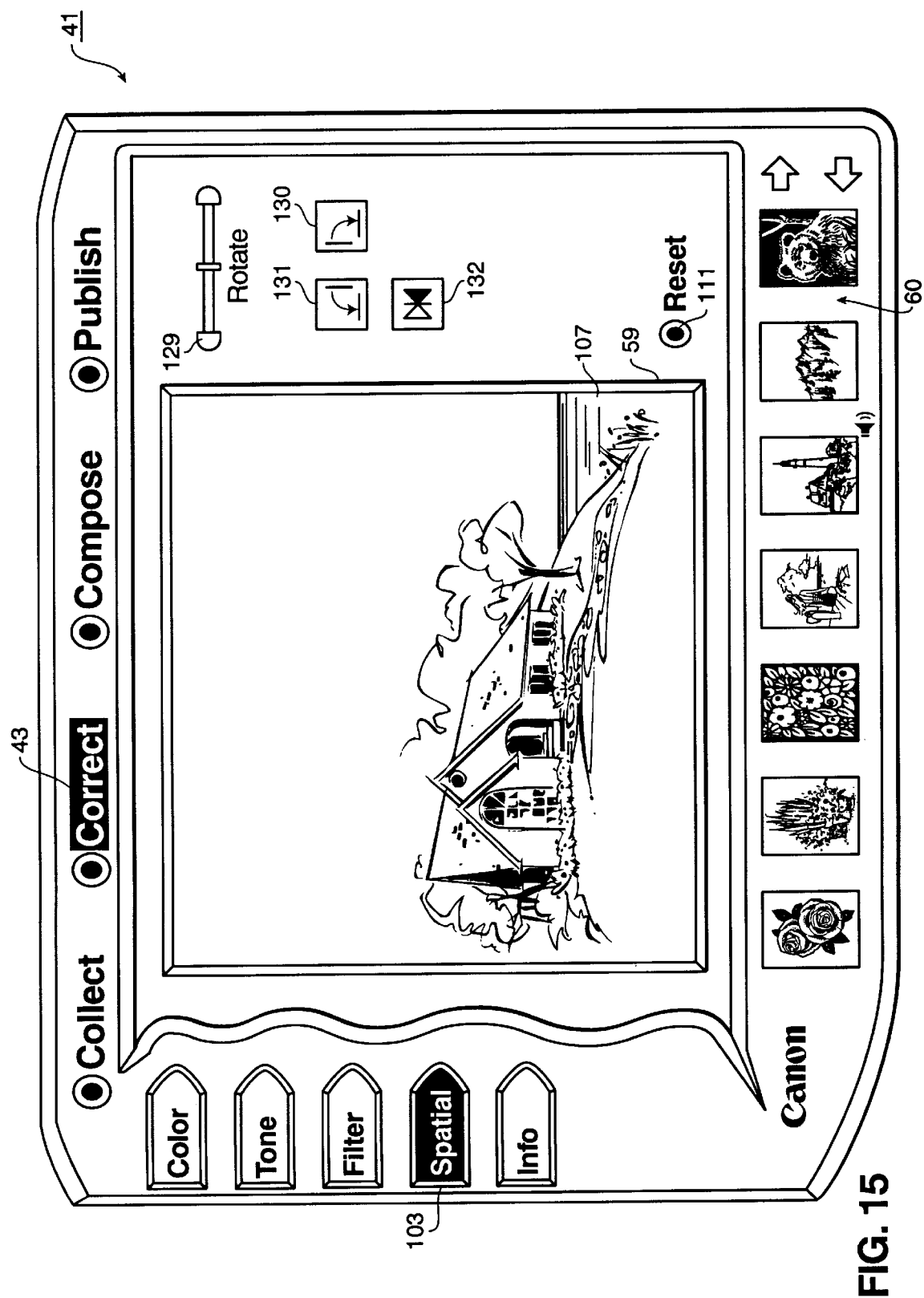
FIG. 15 shows the graphical user interface of FIG. 11 configured to correct the spatial orientation of an image.

Returning to FIG. 3, in step S307, if a correction of the spatial orientation of an image is desired, "Spatial" button 103 is selected using, e.g., pointing device 7. As shown in FIG. 15, once "Spatial" button 103 has been selected, "Spatial" button 103 is highlighted to indicate that it has been selected.

As shown in FIG. 15, upon selection of "Spatial" button 103, GUI 41 displays "Rotate" control 129, 900 rotation buttons 130 and 131, flip button 132, and "Reset" radio button 111. "Reset" radio button 111 is identical to that described above with respect to FIG. 12. Accordingly a detailed description thereof is omitted here for the sake of brevity.

"Rotate" control 129, 90° rotation buttons 130 and 131, and flip button 132 may be used to change viewing parameters in a FlashPix file for image 107. Specifically, with reference to FIG. 15, "Rotate" control 129 provides control over rotation of image 107, preferably causing image 107 to rotate between 0° and 360° in 1° degree increments. Automatic rotation of image 107 by +90° or −90° is provided by rotation buttons 130 and 131, respectively. Flip button 132, upon activation, flips image 107 so as to display a mirror image thereof.

As was the case above, as the spatial orientation of image 107 is changed in GUI 41, the spatial orientation of image 107 shown in workspace 59 is also altered. That is, if +90° rotation button 130 is activated, image 107 displayed in workspace 59 will rotate by +90°. Such changes, however, are not automatically saved in image 107's FlashPix file. Rather a "save" command must be input, via a pull-down menu or the like (not shown), in order to save such changes made via GUI 41.

Following spatial correction of image 107, a new image can be selected for correction by pointing and clicking on an image in workbench 60. This causes the image displayed on workspace 59 to be removed, and redisplayed on workbench 60. The image redisplayed on workbench 60 will include any changes made, and saved, in correcting step S307.

Returning to FIG. 3, in step S307, if correction of information associated with image 107 is desired, "Info" button 104 is selected using, e.g., pointing device 7. In this regard, as noted above, each FlashPix image file stores both raw data for an image and information related to the image. This information can include, but is not limited to, information concerning the hardware device used to capture the image, audio or text information associated with the image, the date that the image was captured, etc. This information can be corrected (i.e., changed) in step S307 using GUI 41 configured in the manner shown in FIG. 16.

Figure 16:
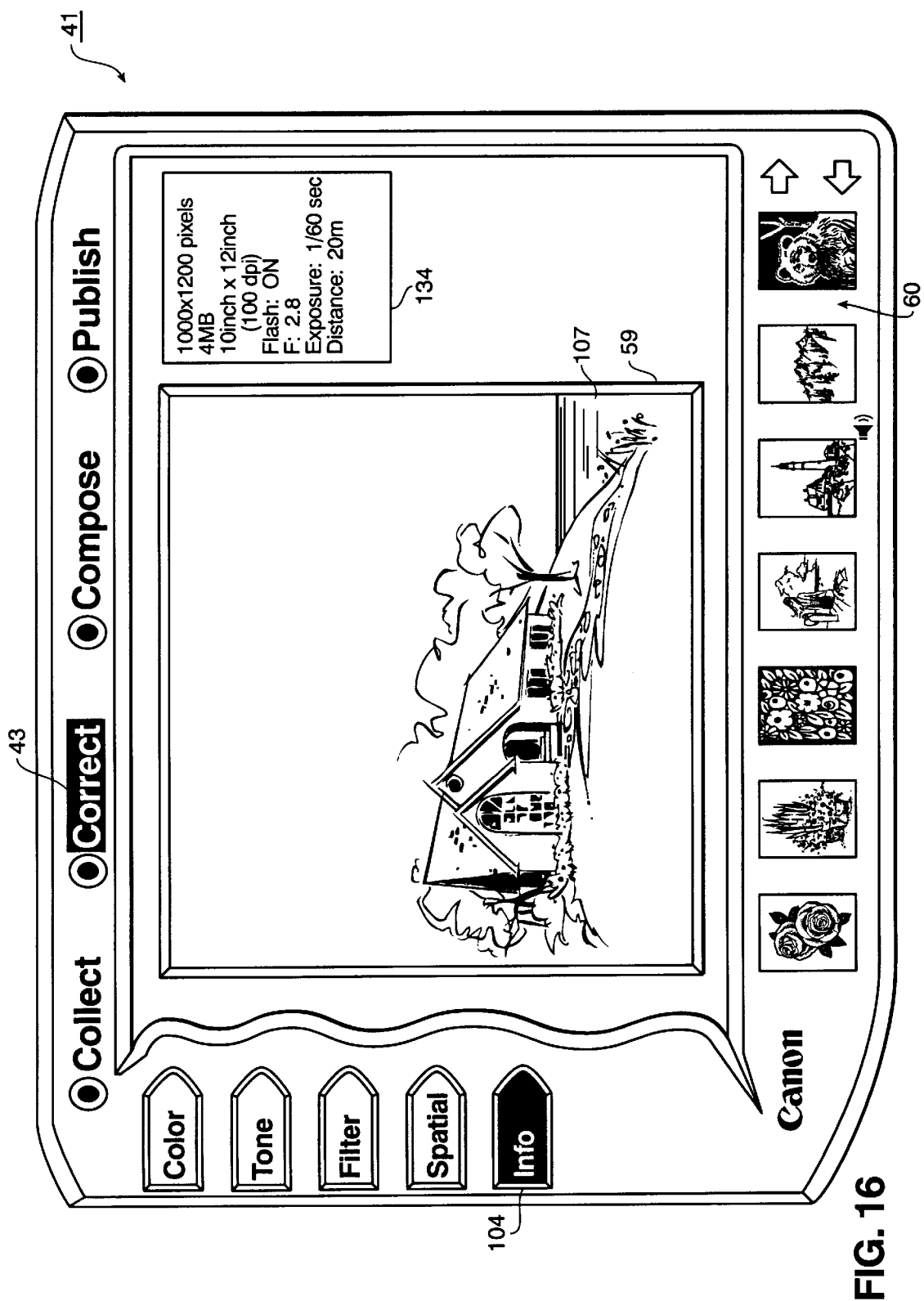
FIG. 16 shows the graphical user interface of FIG. 11 configured to correct information associated with an image.

More specifically, as shown in FIG. 16, once "Info" button 104 has been selected, "Info" button 104 is highlighted to indicate that it has been selected. Upon selection of "Info" button 104, GUI 41 also displays information window 134. Information window 134 displays current information associated with image 107 displayed in workspace 59. This information is retrieved from the FlashPix file which stores image 107, and can be altered using, e.g., pointing device 7 and keyboard 6, as desired.

In the example shown in FIG. 16, the information displayed in window 134 includes information relating to image 107, namely the number of pixels comprising image 107 (i.e., "1000×1200"), the amount of memory needed to store image 107 (i.e., "4 MB"), and the physical size of image 107 (i.e., "10 inch×12 inch"). In this example, window 134 also displays information relating to the hardware device that captured image 107, which, in this case, is a camera. This information indicates that a flash was used during image capture (i.e., "Flash: ON"), provides the camera's F-stop setting (i.e., "F: 2.8"), provides the duration of image exposure (i.e., "Exposure: ⅕₀ sec"), and provides the distance between the camera and the subject in the image (i.e., "Distance: 20 m").

As was the case above, changes made to information displayed in information window 134 are not automatically saved in image 107's FlashPix file. Rather a "save" command must be input, via a pull-down menu or the like (not shown), in order to save the changes made via GUI 41.

Following information correction of image 107, a new image can be selected for correction by pointing and clicking on an image in workbench 60. This causes the image displayed on workspace 59 to be removed, and redisplayed on workbench 60. The image redisplayed on workbench 60 will include any changes made, and saved, in correcting step S307.

Image Composition

Returning to FIG. 3, after image correction has been completed in step S307, processing proceeds to step S308. Step S308 determines whether images displayed in workbench 60 are to be composed. Since composition for all images may not be necessary, image composition is optional. Thus, in a case that image correction is not to be performed, processing proceeds to step S310, which is described below.

In a case that image composition is to be performed, processing proceeds to step S309. Step S309 composes images displayed on workbench 60. More specifically, composing step S309 adds information to, or deletes information from, a FlashPix file of a particular image. Such information can include, but is not limited to, written captions, audio information, and information relating to creation and/or capture of the image, such as the type of hardware device used to capture the image and/or settings on the device.

In preferred embodiments of the invention, the foregoing information can be added to pre-existing portions of a FlashPix file, or can be included in a user-created "extension list" within the FlashPix file. Specifically, in the present invention, audio information for each FlashPix file is stored in an extension list. The remaining information noted above is preferably stored in existing portions of image FlashPix files.

Figure 17:
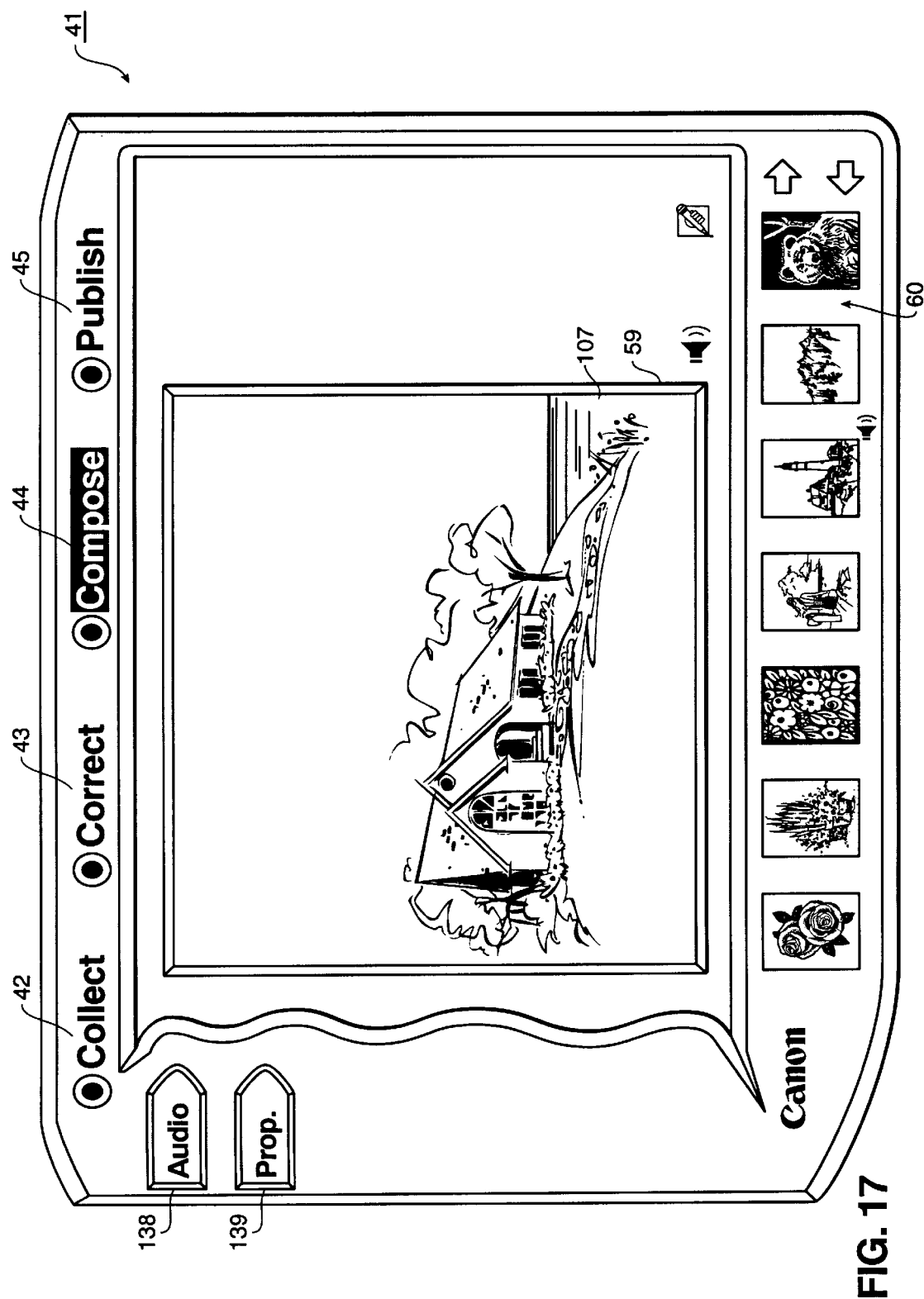
FIG. 17 shows an example of a graphical user interface used by the present invention to compose collected images.
Figure 18:
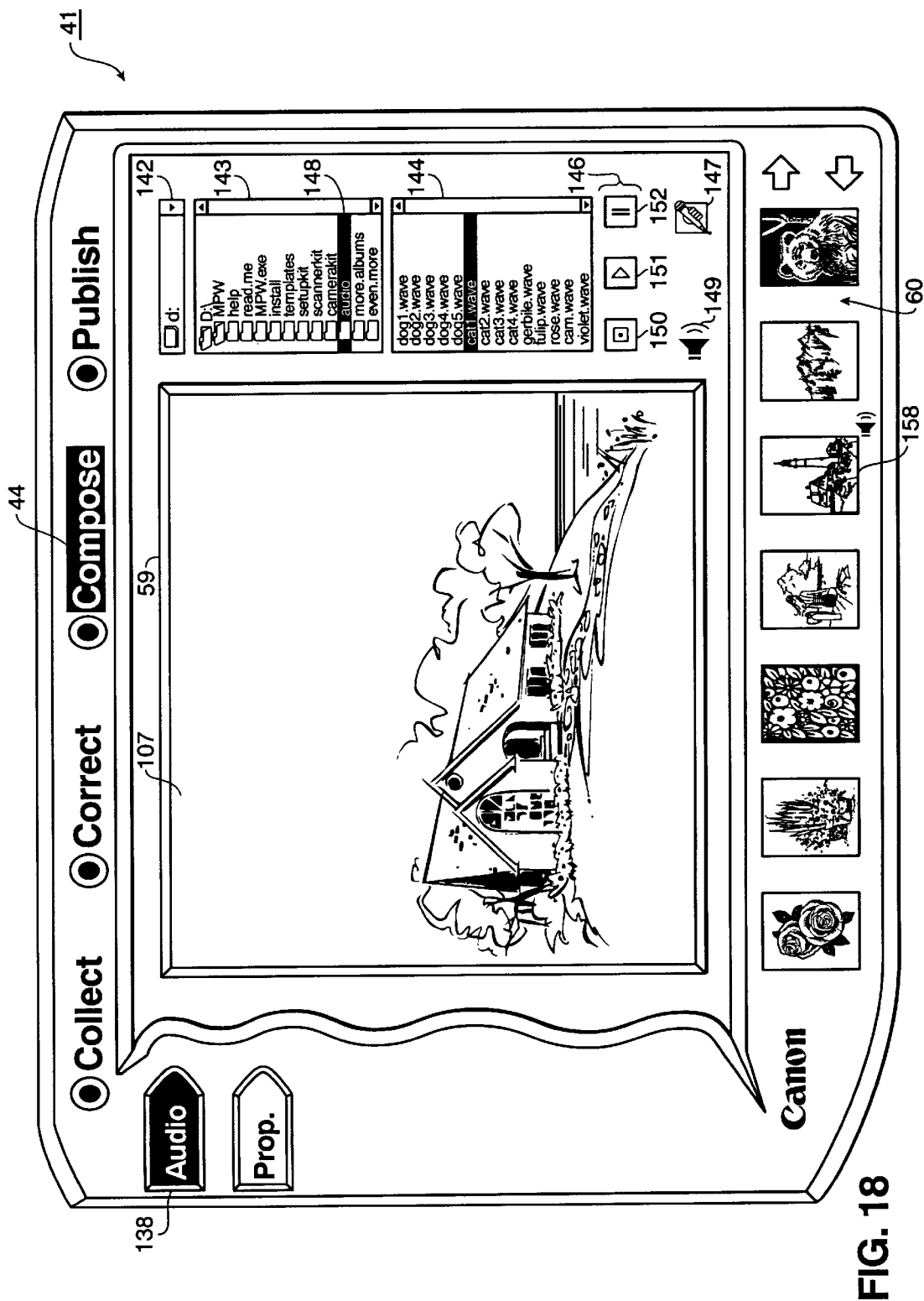
FIG. 18 shows the graphical user interface of FIG. 17 configured to add audio information to collected images.
Figure 19:
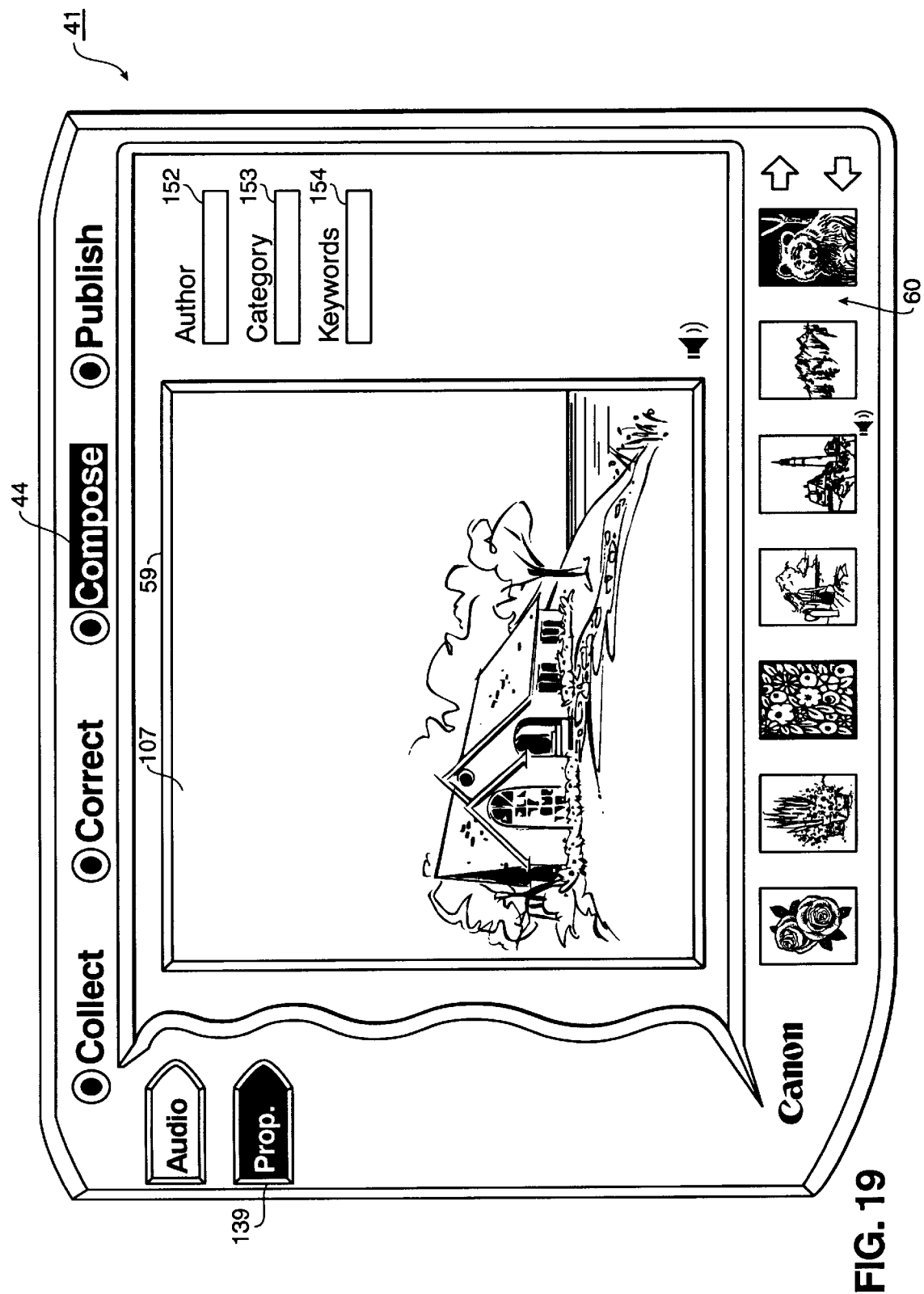
FIG. 19 shows the graphical user interface of FIG. 17 configured to add property information to collected images.

To illustrate the composition process of step S309, reference is made to FIGS. 17 to 19, which show representative embodiments of a GUI that is generated by process steps 21 in order to facilitate image composition. To begin composition in step S309, a user selects "Compose" radio button 44 by, e.g., clicking thereon using pointing device 7. This causes "Compose" radio button 44 to be highlighted, as shown in FIGS. 17 to 19. Selection of "Compose" radio button 44 also causes tool belt buttons 138 and 139, labelled "Audio" and "Prop." (which is short for "properties"), respectively, to be displayed, as shown in FIG. 17. These buttons, which are preferably displayed automatically on the left side of GUI 41, each correspond to a different type of composition. Specific functions of tool belt buttons 138 and 139 are described in more detail below.

Once display of tool belt buttons 138 and 139 has occurred, a user then selects an image from workbench 60 that is to be composed. The image selected for composition may or may not have been corrected in step S307. Preferably, selection is performed by pointing to an image displayed on workbench 60 using pointing device 7, and then clicking on the image. Selection of an image causes the selected image to be displayed on workspace 59 in the same manner as was described above with respect to step S307. Image 107, shown in FIGS. 17 to 19, is an example of an image selected from workbench 60 that is displayed on workspace 59.

Following display of a selected image on workspace 59, composition of displayed image 107 can begin. Specifically, if audio information is to be added to image 107, "Audio" button 138 is selected using, e.g., pointing device 7. As shown in FIG. 18, once "Audio" button 138 has been selected, "Audio" button 138 is highlighted to indicate that it has been selected.

Upon selection of "Audio" button 138, the following are displayed on the right side of GUI 41: windows 142, 143 and 144, playback buttons 146, and microphone icon 147. Window 142 displays the current disk drive, and window 143 displays the current directory, including folders and files stored therein. As shown in FIG. 18, audio files are stored in a folder 148 on the "D" directory shown in window 143. These individual audio (i.e., ".wave") files are displayed in window 144. Pointing device 7 allows a user to select a particular audio file from window 144, and playback buttons 146 allow a user to listen to selected audio files via speaker 14. In this regard, button 150, when selected, stops playback of an audio file; button 152, when selected, continues playback of an audio file; and button 153, when selected, pauses an audio file.

In composing step S309, audio information may be added to (or deleted from) an extension list of a FlashPix file for the image displayed in workspace 59 simply by selecting files from window 144. In this regard, such extensions may be included in a FlashPix file by a hardware device that captures both image and audio information. Upon entry of a "save" command from a pull-down menu or the like, this audio information is saved in the extension list for image 107's FlashPix file. In preferred embodiments of the invention, the duration of the selected audio information can be varied. Such options may be provided by a dialog box or the like (not shown) on GUI 41.

Alternatively, audio information can be added to an image via microphone 12 provided with computing equipment 1. To add audio information, a user clicks on microphone icon 147 on GUI 41, and then speaks into microphone 12. Step S309 then converts this input audio information into an audio file, and associates the audio file with image 107. In response to an input "save" command, process steps 21 store audio information from this file in a FlashPix file for image 107.

Once audio information has been added to image 107, step S309 displays audio icon 149 next to image 107. It is noted that audio icon 149 remains displayed next to image 107 on workbench 60 as well. This feature of the invention is shown with respect to image 158 displayed on workbench 60.

Returning to FIG. 3, in step S309, if written information is to be added to image 107, "Prop." button 139 is selected using, e.g., pointing device 7. As shown in FIG. 19, once "Prop." button 139 has been selected, "Prop." button 139 is highlighted to indicate that it has been selected.

Upon selection of "Prop." button 139, entry boxes 152 to 154, labelled "Author", "category" and "Keywords", respectively, are displayed on GUI 41. Information entered into boxes 152 to 154 corresponds, respectively, to information entered into "Author" line 84, "Category" line 85, and "Keywords" line 86 described above with respect to FIG. 10. Accordingly, a detailed description of these features is omitted here for the sake of brevity. Once entered, this information can be saved to a FlashPix file for a displayed image in response to an input "save" command initiated via a pull-down menu (not shown) or the like.

Following composition of image 107, a new image can be selected for composition by pointing and clicking on an image in workbench 60. This causes the image displayed on workspace 59 to be removed, and redisplayed on workbench 60. The image redisplayed on workbench 60 will include any changes made, and saved, in composing step S309.

Image Publication

Returning to FIG. 3, after image composition has been completed in step S309, processing proceeds to step S310. Step S310 determines whether images are to be published. In a case that publication is not desired, processing ends.

In a case that image publication is to be performed, processing proceeds to step S311. Step S311 publishes images to one or more of a plurality of different destinations. These destinations include, but are not limited to, a video screen, the World Wide Web, and an image forming device, such as a printer. In addition to publishing images, step S311 also publishes selected types of information stored in a FlashPix file for each image displayed on workbench 60. Such information can include information relating to the author of the image, the capture date of the image, the hardware device used to capture the image, settings on that hardware device, etc.

The invention can be configured to publish the set of images automatically in response to a predetermined condition. However, preferred embodiments of the invention publish a set of images in response to a user's input. Specifically, in these embodiments, upon receipt of a command to publish, the invention retrieves an image (preferably an image having high resolution) and other information from a FlashPix file corresponding to an image to be published. As was the case above in step S301, this retrieval may be done using IIP. The invention then outputs the retrieved image and other information, as corrected and composed in correcting and composing steps S307 and S309, respectively, to a specified destination.

As noted above, in preferred embodiments of the invention, low resolution images are displayed during collection, correction, and composition. Since less image data is included in these low resolution images, the amount of time needed to retrieve image data during these processes is reduced. During publication, however, in preferred embodiments of the invention, images are retrieved from FlashPix files which will produce high quality published images on the device used to publish the image. For example, often a high resolution image provides the best quality image on a printer. Accordingly, in these circumstances, a high resolution image is retrieved during publication. Thus, by taking advantage of the FlashPix format, the invention provides high quality published images in a relatively short time.

Figure 20:
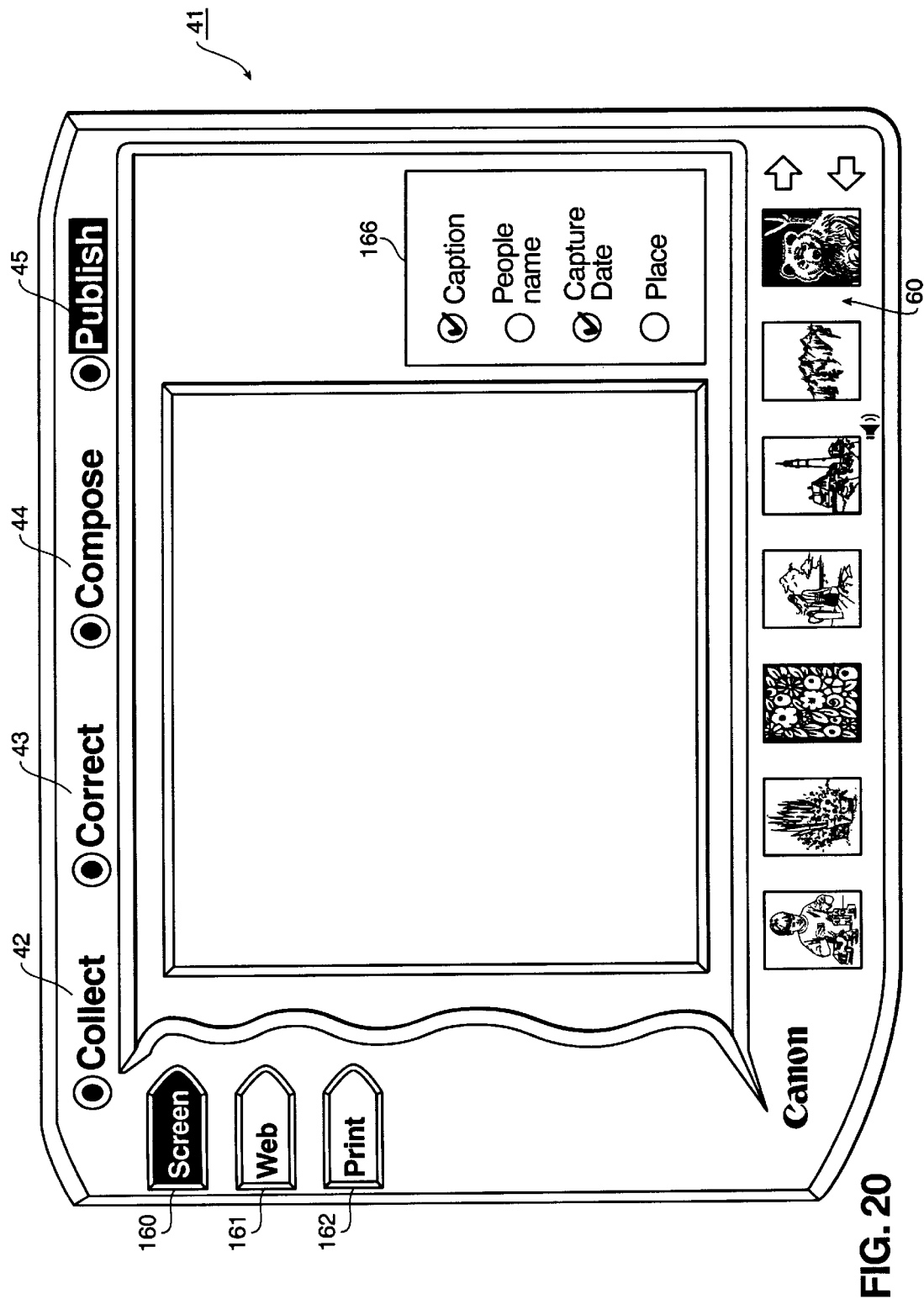
FIG. 20 shows an example of a graphical user interface used by the present invention to publish composed and/or corrected images to a video screen.
Figure 21:
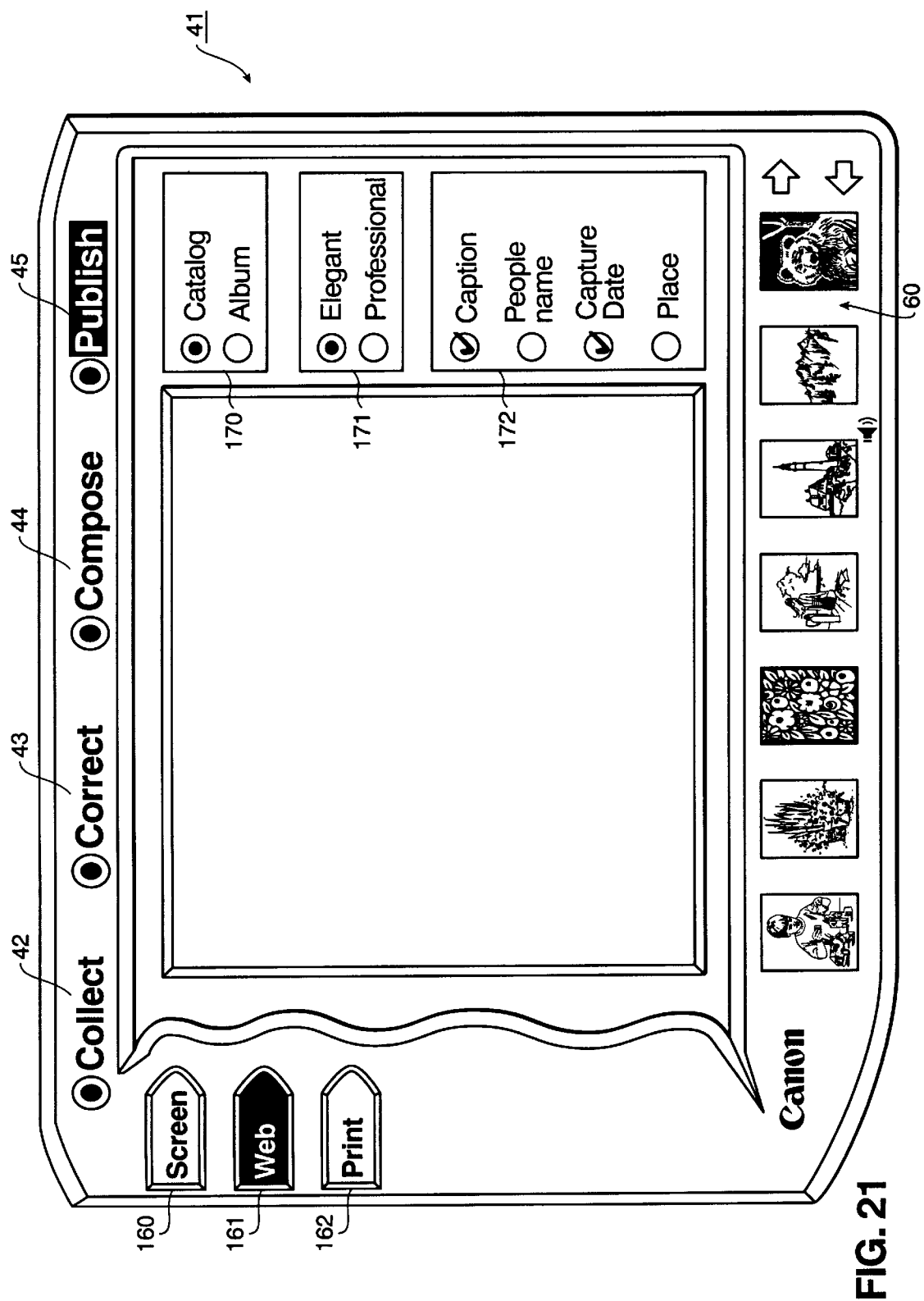
FIG. 21 shows an example of a graphical user interface used by the present invention to publish composed and/or corrected images to the World Wide Web.
Figure 22:
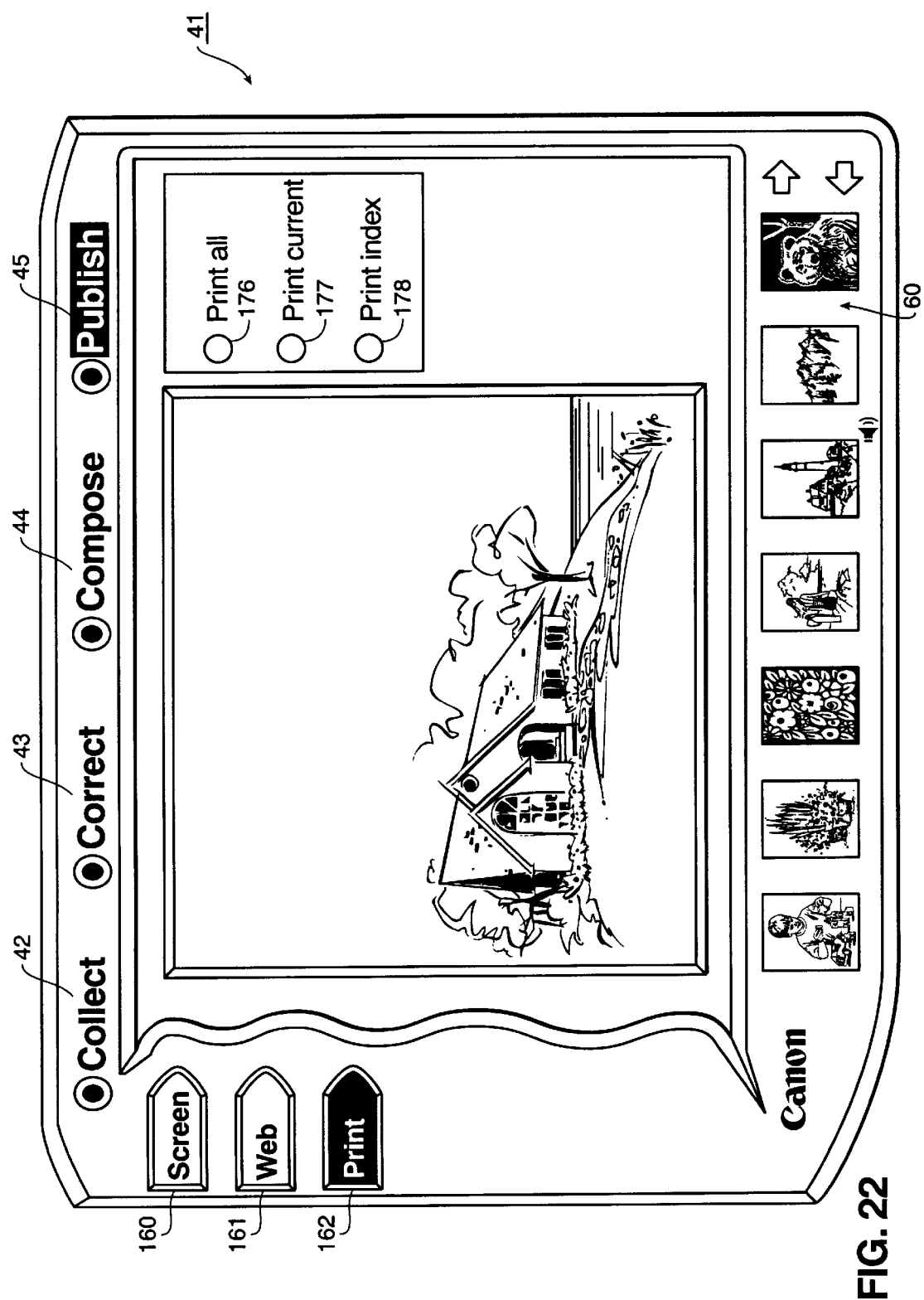
FIG. 22 shows an example of a graphical user interface used by the present invention to publish composed and/or corrected images to a printer.

To illustrate the publication process of step S311, reference is made to FIGS. 20 to 22, which show embodiments of a GUI that is generated by process steps 21 in order to facilitate image publication. To begin publication in step S311, a user selects "Publish" radio button 45 by, e.g., clicking thereon using pointing device 7. This causes "Publish" radio button 45 to be highlighted, as shown in FIGS. 20 to 22. Selection of "Publish" radio button 45 also causes tool belt buttons 160 to 162, labelled "Screen", "Web" and "Print", respectively, to be displayed, as shown in FIGS. 20 to 22. These buttons, which are displayed automatically on the left side of GUI 41, each correspond to a different publication destination. Specific functions of tool belt buttons 160 to 162 are described in more detail below.

Once tool belt buttons 160 to 162 have been displayed, a user can select the publication destination for the set of images displayed on workbench 60. Specifically, if publication to a video screen, such as display screen 4, is desired (e.g., to create a slide show presentation or the like), "Screen" button 160 is selected using, e.g., pointing device 7. As shown in FIG. 20, once "Screen" button 160 has been selected, "Screen" button 160 is highlighted to indicate that it has been selected.

As shown in FIG. 20, upon selection of "Screen" button 160, GUI 41 displays dialog box 166. In the preferred embodiment of the invention shown in FIG. 20, dialog box 166 provides a user with the option to select information to be published to the screen along with each image in the set of images. This information is retrieved from a FlashPix file for each image (along with image data for each image), and is published along with each image.

As shown in FIG. 20, preferably the user can select to publish, along with each image, a caption, a name of a person in the image, the capture date of the image, or the place represented in the image. This list is not meant to be exhaustive, and any information included within a FlashPix file can be published along with the image. Thus, for the example shown in FIG. 16, the invention could publish the camera's F-stop setting, the length of image exposure, the distance between the camera and the subject in the image, the type of camera used, etc. Similarly, audio information for each image could also be published.

Figure 23:
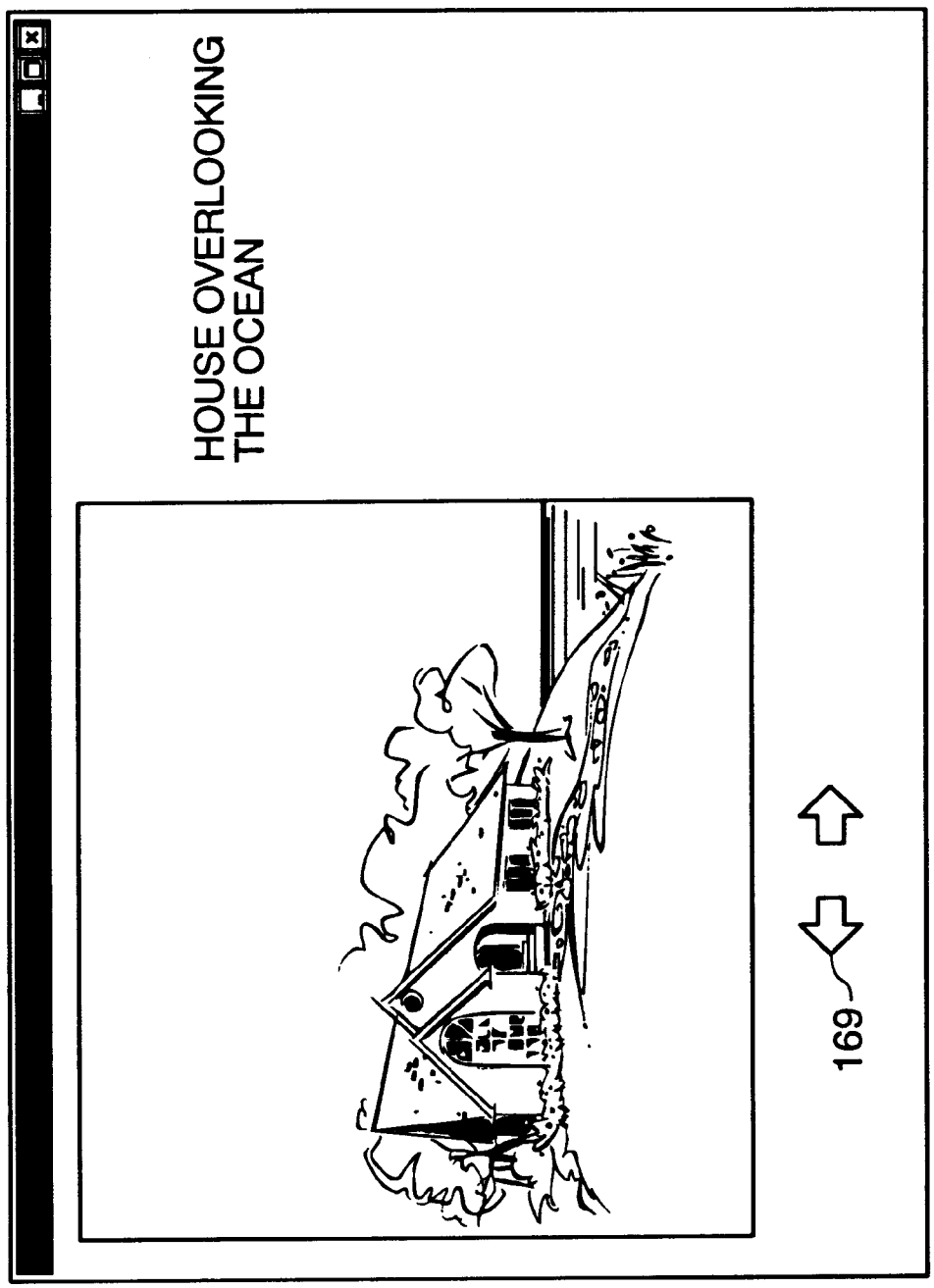
FIG. 23 shows an example of images in a slide show presentation generated by the present invention and displayed on a video screen.

In a case that a slide show presentation is being created, additional options (not shown) may be provided. For example, the user may be permitted to set a duration of display for each image in the slide show. Preferred embodiments, however, provide an interactive display, which allows a user to flip through displayed images manually. That is, in these embodiments the user can determine, using keyboard 6 or pointing device 7, for example, when to turn from one image to the next. An example of an image in a slide show presentation published by the present invention is shown in FIG. 23. As shown, the image in FIG. 23 includes arrows 169, which allow a user to page through to preceding or succeeding images in the slide show using pointing device 7.

Returning to FIG. 3, in step S311, if publication to the World Wide Web is desired, "Web" button 161 is selected using, e.g., pointing device 7. As shown in FIG. 21, once "Web" button 161 has been selected, "Web" button 161 is highlighted to indicate that it has been selected.

As shown in FIG. 21, upon selection of "Web" button 161, GUI 41 displays format dialog box 170, style dialog box 171, and information dialog box 172. In the preferred embodiment of the invention shown in FIG. 21, information dialog box 172 is identical to dialog box 166 shown in FIG. 20. Accordingly, a detailed description thereof is omitted here for the sake of brevity.

Figure 24:
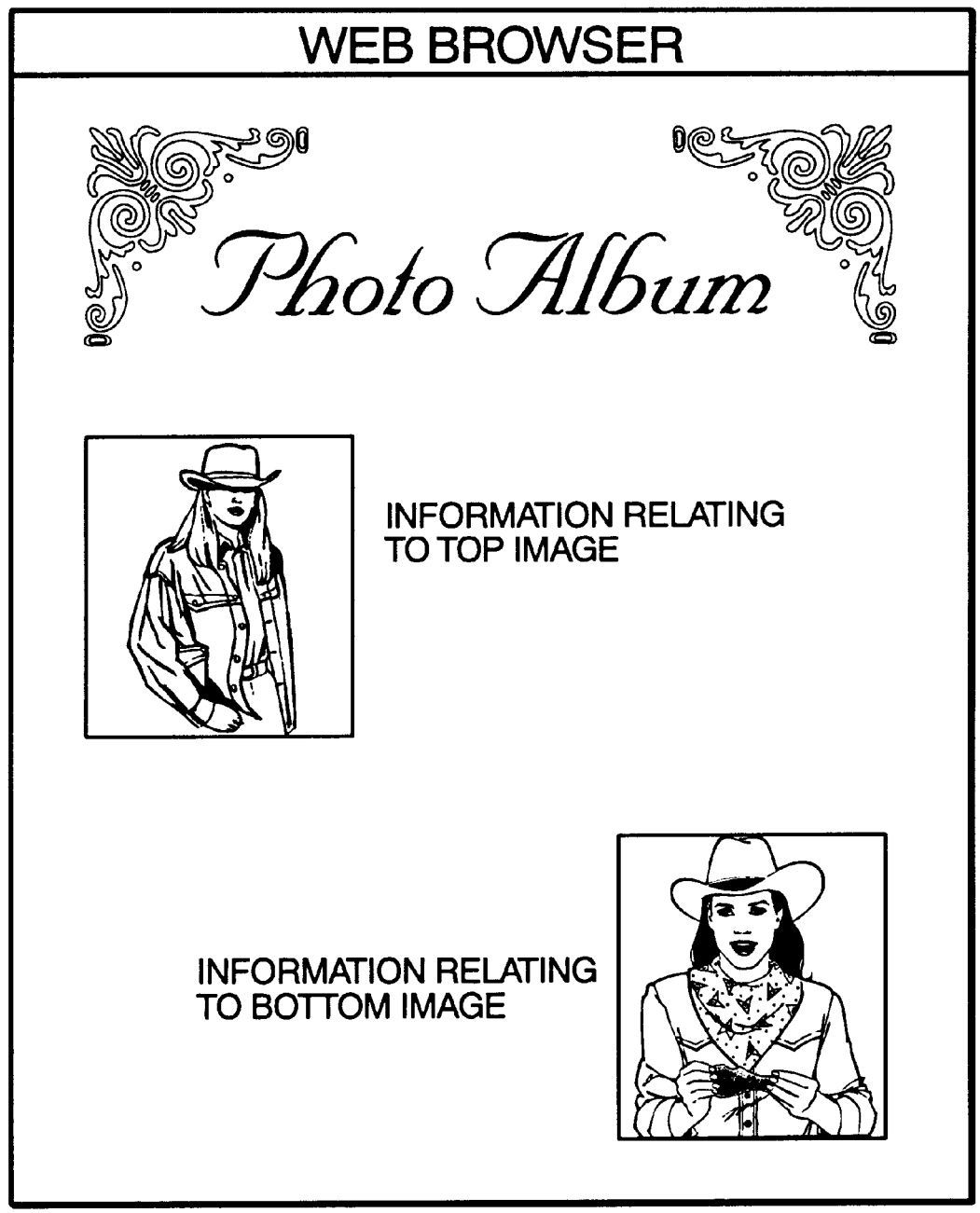
FIG. 24 shows an example of images published in "Catalog" format on the World Wide Web by the present invention.
Figure 25:
FIG. 25 shows an example of images published in "Album" format on the World Wide Web by the present invention.
Figure 25:
Figure 25:

Format dialog box 166 provides the user with the option to publish the set of images in "Catalog" format or "Album" format. An example of "Album" format is shown in FIG. 24, and an example of "Catalog" format is shown in FIG. 25. In addition, "Style" dialog box 171 provides the user with the option to publish the set of images in an "Elegant" or a "Professional" style. These styles vary fonts, graphics, and the like used to display images and associated information.

Once selections have been made in format dialog box 170, style dialog box 171, and information dialog box 172, step S311 publishes the application over the World Wide Web. To do this, step S311 retrieves images (preferably high resolution images) from FlashPix files for images to be published. As noted above, in the case that a FlashPix file for an image is located on the World Wide Web, the connection to that image has been maintained by the invention, thereby facilitating retrieval of an image for publication. Thereafter, step S311 generates HTML page(s), which have the format and style selected in format box 170 and style box 171, respectively, and which include the images and information associated with the images selected in information box 172. These HTML pages are then published over the World Wide Web as shown, for example, in FIGS. 24 and 25.

Returning to FIG. 3, in step S311, if publication to a printer is desired, "Print" button 162 is selected using, e.g., pointing device 7. As shown in FIG. 22, once "Print" button 162 has been selected, "Print" button 162 is highlighted to indicate that it has been selected.

As shown in FIG. 22, upon selection of "Print" button 162, GUI 41 displays "Print all" radio button 176, "Print current" radio button 177, and "Print index" radio button 178. These buttons provide the user with selectable print options. For example, upon selection of "Print all" radio button 176, all images on workbench 60 are printed to a printer, such as printer 15 shown in FIG. 1. Specifically, images are retrieved from FlashPix files corresponding to the images displayed on workbench 60, and those images are printed to printer 15. In preferred embodiments of the invention, information to be printed along with each image may be selected in a manner similar to that shown in FIG. 21, retrieved from images' FlashPix files, and printed along with the images.

Returning to FIG. 22, upon selection of "Print current" radio button 177, a current image in workspace 59 is printed. That is, when "Print current" radio button 177 is selected, whichever image currently appears in workspace 59 is published to the printer. Image retrieval and printing is performed in the manner described above. As was the case above, in preferred embodiments of the invention, selected information associated with the current image can be retrieved and printed along with the image.

Figure 26:
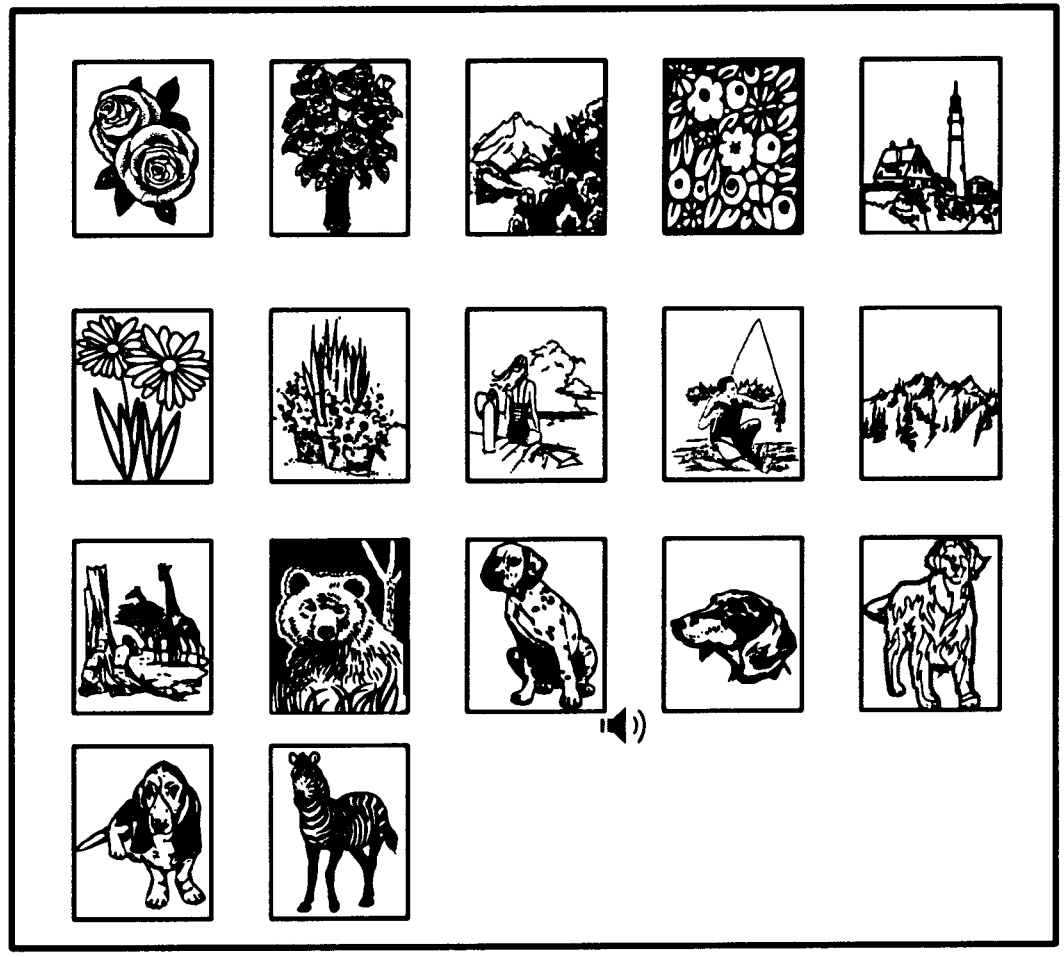
FIG. 26 shows an example of a contact sheet, comprising thumbnail images, published by the present invention.

Next, "Print index" radio button 178 provides the user with the option to print a contact sheet, an example of which is shown in FIG. 26. As shown, the contact sheet preferably comprises thumbnail versions of the images on workbench 60, along with associated icons, such as an audio icon and any associated captions. Image retrieval and printing is performed in the manner noted above.

Returning to FIG. 3, following publication in step S311, processing of the flowchart shown in FIG. 3 ends. In this regard, it should be noted that image collection, correction, composition and publication, as shown in FIG. 3, may be performed in any order, and that the order shown in FIG. 3 is merely for the sake of explanation.

The invention has been described with respect to particular illustrative embodiments. It is to be understood that the invention is not limited to the above-described embodiments and that various changes and modifications may be made by those of ordinary skill in the art without departing from the spirit and scope of the appended claims.

What is claimed is:

1. A method, for use on a computer system, of creating and publishing a set of images, each image in the set being stored in a multi-resolution image file which contains at least the image in multiple resolutions, viewing parameters for viewing the image, and information related to the image, the method comprising the steps of:

displaying, in a first portion of a user interface on a computer-generated workbench, a plurality of images retrieved from multi-resolution image files;

correcting, in a workspace in a second portion of the user interface, images selected from the workbench, the correcting step comprising altering viewing parameters in multi-resolution image files corresponding to the selected images, and updating the selected images on the workbench to include corrections made in the workspace, the corrections made in the second portion of the user interface updating images displayed in the first portion of the user interface;

composing, in the workspace, images selected from the workbench, the composing step comprising adding or deleting, from multi-resolution image files corresponding to the selected images, information related to the selected images; and publishing a set of images displayed on the workbench, the set of images comprising corrected and composed images.

2. A method according to claim 1, further comprising, before the displaying step, the steps of:

collecting a plurality of low resolution images from FlashPix files; and selecting, from the images collected in the collecting step, a plurality of the low resolution images for inclusion onto the workbench.

3. A method according to claim 2, further comprising, between the collecting and selecting steps, the step of displaying the plurality of low resolution images in a computer-generated workspace;

wherein the selecting step comprises selecting low resolution images displayed in the computer-generated workspace for inclusion into the set of images.

4. A method according to claim 2, wherein in the collecting step, the images are collected from one or more of the following sources: a hardware device, stored files, an electronic album, the World Wide Web, and a database; and wherein the publishing step publishes, along with each image in the set, information relating to the source of each image.

5. A method according to claim 4, wherein, in a case that the source is the World Wide Web, low resolution images are collected using Internet Imaging Protocol.

6. A method according to claim 2, wherein a multi resolution image file for each image stores the image in four resolutions; and wherein the plurality of low resolution images collected in the collecting step comprise, for each image, a lowest resolution image stored in a multi resolution image file for the image.

7. A method according to claim 2, wherein the collecting step comprises:

searching for particular images based on designated search parameters; and retrieving low resolution images from multi resolution image files for images found in the searching step.

8. A method according to claim 1, wherein the displaying step comprises displaying, along with the images on the workbench, information related to the images.

9. A method according to claim 8, wherein the information related to the images comprises an icon which indicates that audio information is associated with an image.

10. A method according to claim 1, wherein the correcting step comprises changing color parameters for the images.

11. A method according to claim 1, wherein the correcting step comprises altering a magnification of the images.

12. A method according to claim 1, wherein the composing step comprises adding or deleting, from a multi-resolution image file of a designated image, one or more of the following: a written caption, audio information, and additional information relating to creation and/or capture of the image.

13. A method according to claim 12, wherein the multi-resolution image file of the designated image includes an extension list which stores the audio information.

14. A method according to claim 1, wherein the publishing step is performed automatically in response to a predetermined condition, or manually in response to a user's input.

15. A method according to claim 1, wherein the publishing step comprises publishing the set of images to one of the following destinations: a video screen, the World Wide Web, and an image forming device.

16. A method according to claim 15, wherein the image forming device comprises a printer.

17. A method according to claim 14, wherein the publishing step comprises:

selecting types of information associated with each image in the set of images; and publishing, with the set of images, a selected type of information for each image in the set.

18. A method according to claim 1, wherein the publishing step comprises, for a designated image in the set of images, retrieving an image from a multi-resolution image file which corresponds to the designated image based on a hardware device used to publish the image, and outputting the image as corrected and composed in the correcting and composing steps, respectively.

19. A method according to claim 18, wherein in a case that the one or more sources in the collecting step comprises the World Wide Web, the publishing step comprises retrieving the image from the multi-resolution image file for the designated image using Internet Imaging Protocol.

20. A method according to claim 1, wherein the publishing step comprises publishing thumbnail versions of the images displayed on the workbench.

21. An apparatus for creating and publishing a set of images, each image in the set being stored in a multi-resolution image file which contains the image in multiple resolutions, viewing parameters for viewing the image, and information related to the image, the apparatus comprising:

a user interface for inputting data and commands into the apparatus;

a memory which stores executable process steps; and a processor, which executes process steps stored in the memory (1) to display, in a first portion of a user interface on a computer-generated workbench, images retrieved from multi-resolution image files, (2) to correct, in a workspace in the second portion of the user interface, images selected from the workbench, the correcting step comprising altering viewing parameters in multi-resolution image files corresponding to the selected images, and updating the selected images on the workbench to include corrections made in the workspace, the corrections made in the second portion of the user interface updating images displayed in the first portion of the user interface, (3) to compose, in the workspace, images selected from the workbench, the composing step comprising adding or deleting, from multi-resolution image files corresponding to the displayed images, information related to the displayed images, and (4) to publish a set of images displayed on the workbench, the set of images comprising corrected and composed images.

22. A method according to claim 21, wherein, before displaying the plurality of images in the workbench, the processor executes process steps to collect a plurality of low resolution images from FlashPix files, and to select, from the collected images, a plurality of the low resolution images for inclusion onto the workbench.

23. An apparatus according to claim 22, wherein, between collecting and selecting, the processor displays the plurality of low resolution images in a computer-generated workspace; and wherein the selecting performed by the processor (1) is in response to a command input from the user interface, and (2) comprises selecting displayed low resolution images for inclusion into the workbench.

24. An apparatus according to claim 22, wherein FlashPix files corresponding to the plurality of low resolution images are collected from one or more of the following sources: a hardware device, stored files, an electronic album, the World Wide Web, and a database; and wherein the processor publishes, along with each image in the set of images, information relating to the source of each image.

25. An apparatus according to claim 24, wherein, in a case that the source of an image is the World Wide Web, a low resolution image for the image is collected using Internet Imaging Protocol.

26. An apparatus according to claim 22, wherein FlashPix files for each image store the image in four resolutions; and wherein the plurality of low resolution images collected by the processor comprise, for each image, a lowest resolution image stored in a FlashPix file for the image.

27. An apparatus according to claim 22, wherein the processor collects the plurality of low resolution images by searching for particular images based on designated search parameters, and retrieving low resolution images from FlashPix files for found images.

28. An apparatus according to claim 21, wherein the processor displays, along with the images on the workbench, information related to the images.

29. An apparatus according to claim 28, wherein the information related to the images comprises an icon which indicates that audio information is associated with an image.

30. An apparatus according to claim 21, wherein the processor corrects the images by changing color parameters for the images.

31. An apparatus according to claim 21, wherein the processor corrects the images by altering a magnification of the images.

32. An apparatus according to claim 21, wherein the processor composes displayed images by adding or deleting, from a FlashPix file of a designated image, one or more of the following: a written caption, audio information, and additional information relating to creation and/or capture of the image.

33. An apparatus according to claim 32, wherein the FlashPix file of the designated image includes an extension list which stores the audio information.

34. An apparatus according to claim 21, wherein the processor publishes the set of images either automatically in response to a predetermined condition, or manually in response to a command input via the user interface.

35. An apparatus according to claim 21, wherein the processor publishes the set of images to one of the following destinations: a video screen, the World Wide Web, and an image forming device.

36. An apparatus according to claim 35, wherein the image forming device comprises a printer.

37. An apparatus according to claim 35, wherein the processor publishes the set of images by selecting types of information associated with each image in the set of images, and publishing, with the set of images, a selected type of information for each image in the set.

38. An apparatus according to claim 21, wherein the publishing step comprises publishing thumbnail versions of the images displayed on the workbench.

39. An apparatus according to claim 21, wherein, for a designated image in the set of images, the processor publishes the image by retrieving an image from a FlashPix file which corresponds to the designated image based on a hardware device used to publish the image, and outputs the image as corrected and composed by the processor.

40. An apparatus according to claim 39, wherein in a case that the one or more sources is the World Wide Web, the processor publishes the designated image by retrieving the image from the FlashPix file for the designated image using Internet Imaging Protocol.

41. Computer-executable process steps stored on a computer-readable medium, the process steps for use on a computer system to create and publish a set of images, each image in the set being stored in a multi-resolution image file which contains at least the image in multiple resolutions, viewing parameters for viewing the image, and information related to the image, the process steps comprising:

code to display, in a first portion of a user interface on a computer-generated workbench, a plurality of images retrieved from multi-resolution image files;

code to correct, in a workspace in a second portion of the user interface, images selected from the workbench, the code to correct comprising code to alter viewing parameters in multi-resolution image files corresponding to the selected images, and updating the selected images on the workbench to include corrections made in the workspace, the corrections made in the second portion of the user interface updating images displayed in the first portion of the user interface;

code to compose, in the workspace, images selected from the workbench, the composing step comprising adding or deleting, from multi-resolution image files corresponding to the selected images, information related to the selected images; and code to publish a set of images displayed on the workbench, the set of images comprising corrected and composed images.

42. Computer-executable process steps according to claim 41, further comprising:

code to collect a plurality of low resolution images from FlashPix files; and code to select, from the images collected by the code to collect, a plurality of the low resolution images for inclusion onto the workbench.

43. Computer-executable process steps according to claim 42, further comprising, between the code to collect and the code to select, code to display the plurality of low resolution images in a computer-generated workspace;

wherein the code to select selects low resolution images displayed in the computer-generated workspace for inclusion into the set of images.

44. Computer-executable process steps according to claim 42, wherein the code to collect collects the FlashPix images from one or more of the following sources: a hardware device, stored files, an electronic album, the World Wide Web, and a database; and wherein the code to publish publishes, along with each image in the set, information relating to the source of each image.

45. Computer-executable process steps according to claim 44, wherein, in a case that the source is the World Wide Web, low resolution images are collected using Internet Imaging Protocol.

46. Computer-executable process steps according to claim 42, wherein a FlashPix file for each image stores the image in four resolutions; and wherein the plurality of low resolution images collected by the code to collect comprise, for each image, a lowest resolution image stored in a FlashPix file for the image.

47. Computer-executable process steps according to claim 42, wherein the code to collect comprises:

code to search for particular images based on designated search parameters; and code to retrieve low resolution images from FlashPix files for images found in the searching step.

48. Computer-executable process steps according to claim 41, wherein the code to display displays, along with the images on the workbench, information related to the images.

49. Computer-executable process steps according to claim 48, wherein the information related to the images comprises an icon which indicates that audio information is associated with an image.

50. Computer-executable process steps according to claim 41, wherein the code to correct changes color parameters for the images.

51. Computer-executable process steps according to claim 41, wherein the code to correct comprises code to alter a magnification of the images.

52. Computer-executable process steps according to claim 41, wherein the code to compose comprises code to add or delete, from a Flashpix file of a designated image, one or more of the following: a written caption, audio information, and additional information relating to creation and/or capture of the image.

53. Computer-executable process steps according to claim 52, wherein the FlashPix file of the designated image includes an extension list which stores the audio information.

54. Computer-executable process steps according to claim 41, wherein the code to publish is executed automatically in response to a predetermined condition, or manually in response to a user's input.

55. Computer-executable process steps according to claim 41, wherein the code to publish publishes the set of images to one of the following destinations: a video screen, the World Wide Web, and an image forming device.

56. Computer-executable process steps according to claim 55, wherein the image forming device comprises a printer.

57. Computer-executable process steps according to claim 54, wherein the code to publish comprises:

code to select types of information associated with each image in the set of images; and code to publish, with the set of images, a selected type of information for each image in the set.

58. Computer-executable process steps according to claim 41, wherein the code to publish comprises, for a designated image in the set of images, code to retrieve an image from a FlashPix file corresponding to the designated image based on a hardware device used to publish the image, and code to output the image as corrected and composed by the code to correct and the code to compose, respectively.

59. Computer-executable process steps according to claim 58, wherein, in a case that the one or more sources in the collecting step comprises the World Wide Web, the code to publish comprises code to retrieve the image from the FlashPix file for the designated image using Internet Imaging Protocol.

60. Computer-executable process steps according to claim 41, wherein the code to publish publishes thumbnail versions of the images displayed on the workbench.

61. A computer-readable medium which stores computer-executable process steps for use on a computer system, the process steps to create and to publish a set of images, each image in the set being stored in a multi-resolution image file which contains at least the image in multiple resolutions, viewing parameters for viewing the image, and information related to the image, the process steps comprising:

a displaying step to display, in a first portion of a user interface on a computer-generated workbench, a plurality of images retrieved from multi-resolution image files;

a correcting step to correct, in a workspace in a second portion of the user interface images selected from the workbench, the correcting step comprising altering viewing parameters in multi-resolution image files corresponding to the selected images, and updating the selected images on the workbench to include corrections made in the workspace, the corrections made in the second portion of the user interface updating images displayed in the first portion of the user interface;

a composing step to compose, in the workspace, images selected from the workbench, the composing step comprising adding or deleting, from multi-resolution image files corresponding to the selected images, information related to the selected images; and a publishing step to publish a set of images displayed on the workbench, the set of images comprising corrected and composed images.

62. A computer-readable medium according to claim 61, further comprising, before the displaying step:

a collecting step to collect a plurality of low resolution images from FlashPix files; and a selecting step to select, from the images collected in the collecting step, a plurality of the low resolution images for inclusion onto the workbench.

63. A computer-readable medium according to claim 62, further comprising, between the collecting and selecting steps, a displaying step to display the plurality of low resolution images in a computer-generated workspace;

wherein the selecting step comprises selecting low resolution images displayed in the computer-generated workspace for inclusion into the set of images.

64. A computer-readable medium according to claim 62, wherein in the collecting step, the FlashPix images are collected from one or more of the following sources: a hardware device, stored files, an electronic album, the World Wide Web, and a database; and wherein the publishing step publishes, along with each image in the set, information relating to the source of each image.

65. A computer-readable medium according to claim 64, wherein, in a case that the source is the World Wide Web, low resolution images are collected using Internet Imaging Protocol.

66. A computer-readable medium according to claim 62, wherein a FlashPix file for each image stores the image in four resolutions; and wherein the plurality of low resolution images collected in the collecting step comprise, for each image, a lowest resolution image stored in a FlashPix file for the image.

67. A computer-readable medium according to claim 62, wherein the collecting step comprises:

a searching step to search for particular images based on designated search parameters; and a retrieving step to retrieve low resolution images from FlashPix files for images found in the searching step.

68. A computer-readable medium according to claim 61, wherein the displaying step comprises displaying, along with the images on the workbench, information related to the images.

69. A computer-readable medium according to claim 68, wherein the information related to the images comprises an icon which indicates that audio information is associated with an image.

70. A computer-readable medium according to claim 61, wherein the correcting step comprises changing color parameters for the images.

71. A computer-readable medium according to claim 61, wherein the correcting step comprises altering a magnification of the images.

72. A computer-readable medium according to claim 61, wherein the composing step comprises adding or deleting, from a FlashPix file of a designated image, one or more of the following: a written caption, audio information, and additional information relating to creation and/or capture of the image.

73. A computer-readable medium according to claim 72, wherein the FlashPix file of the designated image includes an extension list which stores the audio information.

74. A computer-readable medium according to claim 61, wherein the publishing step is performed automatically in response to a predetermined condition, or manually in response to a user's input.

75. A computer-readable medium according to claim 61, wherein the publishing step comprises publishing the set of images to one of the following destinations: a video screen, the World Wide Web, and an image forming device.

76. A computer-readable medium according to claim 75, wherein the image forming device comprises a printer.

77. A computer-readable medium according to claim 74, wherein the publishing step comprises:

selecting types of information associated with each image in the set of images; and publishing, with the set of images, a selected type of information for each image in the set.

78. A computer-readable medium according to claim 61, wherein the publishing step comprises, for a designated image in the set of images, retrieving an image from a FlashPix file which corresponds to the designated image based on a hardware device used to publish the image, and outputting the image as corrected and composed in the correcting and composing steps, respectively.

79. A computer-readable medium according to claim 78, wherein in a case that the one or more sources in the collecting step comprises the World Wide Web, the publishing step comprises retrieving the image from the FlashPix file for the designated image using Internet Imaging Protocol.

80. A computer-readable medium according to claim 61, wherein the publishing step comprises publishing thumbnail versions of the images displayed on the workbench.

81. The method according to claim 1, wherein the plurality of images are displayed in the first portion of the user interface in one resolution and in a different resolution in the second portion of the user interface.

82. An apparatus according to claim 21, wherein the plurality of images are displayed in the first portion of the user interface in one resolution and in a different resolution in the second portion of the user interface.

83. Computer-executable process steps according to claim 41, wherein the plurality of images are displayed in the first portion of the user interface in one resolution and in a different resolution in the second portion of the user interface.

84. Computer-readable medium according to claim 61, wherein the plurality of images are displayed in the first portion of the user interface in one resolution and in a different resolution in the second portion of the user interface.

* * * * *

UNITED STATES PATENT AND TRADEMARK OFFICE
CERTIFICATE OF CORRECTION

PATENT NO. : 6,237,010 B1
DATED : May 22, 2001
INVENTOR(S) : Jonathan Hui et al.

It is certified that error appears in the above-identified patent and that said Letters Patent is hereby corrected as shown below:

Title page,
Item [56], References Cited, OTHER PUBLICATIONS,
"See For Yourself", Kodak: FlashPix Sample Pictures Index (visited Sep. 5, 1997), Eastman Kodak Company, 1994-1997, <http://www.kodak.com/diaHome/FlashPix/flashPixSamples.shtml> (1 page)." should read -- "See For Yourself", Kodak: FlashPixSample Pictures Index (visited Sep. 5, 1997), Eastman Kodak Company, 1994-1997, <http://www.kodak.com/daiHome/FlashPix/flashPixSamples.shtml>(1 page). --.

FIGURES,
Fig. 9, step 77, "majic" should read -- magic --.

Column 6,
Line 7, "is" should read -- are --.

Column 13,
Line 29, "900 rotation" should read -- 90° rotation --.

Column 19,
Line 43, "FlashPix" should read -- multi-resolution image --.
Line 65, "multi" should read -- multi- --.

Column 20,
Line 3, "multi resolution" should read -- multi-resolution --.
Line 8, "multi resolution" should read -- multi-resolution --.

Column 21,
Line 23, "FlashPix" should read -- multi-resolution image --.
Line 34, "FlashPix" should be deleted.
Line 46, "Flash Pix" should read -- multi-resolution image --.
Line 50, "FlashPix" should read -- multi-resolution image --.
Line 55, "FlashPix" should read -- multi-resolution image --.

UNITED STATES PATENT AND TRADEMARK OFFICE
CERTIFICATE OF CORRECTION

PATENT NO. : 6,237,010 B1
DATED : May 22, 2001
INVENTOR(S) : Jonathan Hui et al.

It is certified that error appears in the above-identified patent and that said Letters Patent is hereby corrected as shown below:

Column 22,
Line 3, "FlashPix" should read -- multi-resolution image --.
Line 7, "FlashPix" should read -- multi-resolution image --.
Line 29, "FlashPix" should read -- multi-resolution image --.
Line 36, "FlashPix" should read -- multi-resolution image --.

Column 23,
Line 2, "FlashPix" should read -- multi-resolution image --.
Line 14, "FlashPix" should be deleted.
Line 26, "FlashPix" should read -- multi-resolution image --.
Line 30, "FlashPix" should read -- multi-resolution image --.
Line 36, "FlashPix" should read -- multi-resolution image --.
Line 54, "FlashPix" should read -- multi-resolution image --.
Line 59, "FlashPix" should read -- multi-resolution image --.

Column 24,
Line 14, "FlashPix" should read -- multi-resolution image --.
Line 22, "FlashPix" should read -- multi-resolution image --.
Line 60, "FlashPix" should read -- multi-resolution image --.

Column 25,
Line 5, "FlashPix" should be deleted.
Line 17, "FlashPix" should read -- multi-resolution image --.
Line 21, "FlashPix" should read -- multi-resolution image --.
Line 27, "FlashPix" should read -- multi-resolution image --.
Line 44, "FlashPix" should read -- multi-resolution image --.
Line 49, "FlashPix" should read -- multi-resolution image --.

UNITED STATES PATENT AND TRADEMARK OFFICE
CERTIFICATE OF CORRECTION

PATENT NO. : 6,237,010 B1
DATED : May 22, 2001
INVENTOR(S) : Jonathan Hui et al.

It is certified that error appears in the above-identified patent and that said Letters Patent is hereby corrected as shown below:

Column 26,
Line 19, "FlashPix" should read -- multi-resolution image --.
Line 26, "FlashPix" should read -- multi-resolution image --.

Signed and Sealed this

Twenty-third Day of April, 2002

Attest:

JAMES E. ROGAN
*Attesting Officer*  *Director of the United States Patent and Trademark Office*